US010846561B1

(12) United States Patent
Floerkemeier et al.

(10) Patent No.: US 10,846,561 B1
(45) Date of Patent: Nov. 24, 2020

(54) RECOGNITION AND SELECTION OF DISCRETE PATTERNS WITHIN A SCENE OR IMAGE

(71) Applicant: SCANDIT AG, Zurich (CH)

(72) Inventors: Christian Floerkemeier, Zurich (CH); Maiya Shur, Zurich (CH); Bernd Schoner, New York, NY (US)

(73) Assignee: Scandit AG, Zurich (CH)

( * ) Notice: Subject to any disclaimer, the term of this patent is extended or adjusted under 35 U.S.C. 154(b) by 0 days.

(21) Appl. No.: 16/905,722

(22) Filed: Jun. 18, 2020

Related U.S. Application Data

(60) Provisional application No. 63/003,675, filed on Apr. 1, 2020, provisional application No. 63/017,493, filed on Apr. 29, 2020, provisional application No. 63/019,818, filed on May 4, 2020.

(51) Int. Cl.
| | | |
|---|---|---|
| *G06K 9/00* | (2006.01) | |
| *G06K 7/10* | (2006.01) | |
| *G06K 9/62* | (2006.01) | |
| *G06T 11/00* | (2006.01) | |
| *G06K 9/68* | (2006.01) | |
| *G06K 9/52* | (2006.01) | |

(52) U.S. Cl.
CPC ............ *G06K 9/6202* (2013.01); *G06K 9/52* (2013.01); *G06K 9/685* (2013.01); *G06T 11/00* (2013.01)

(58) Field of Classification Search
USPC ....... 382/100, 103, 106, 116, 155, 162, 168, 382/173, 181, 190, 199, 209, 219, 232, 382/254, 274, 276, 285–291, 305, 321; 235/462.41, 462.01, 385
See application file for complete search history.

(56) References Cited

U.S. PATENT DOCUMENTS

| | | | |
|---|---|---|---|
| 8,596,540 B2 | 12/2013 | Adelmann | |
| 9,836,635 B2 | 12/2017 | Negro et al. | |
| 10,229,301 B2 | 3/2019 | Cumoli et al. | |
| 2006/0249581 A1 | 11/2006 | Smith | |
| 2009/0108071 A1 | 4/2009 | Carlson | |
| 2009/0212113 A1* | 8/2009 | Chiu | G06K 7/1443 235/462.41 |
| 2009/0304234 A1 | 12/2009 | Kondo et al. | |
| 2013/0112750 A1 | 5/2013 | Negro et al. | |

(Continued)

OTHER PUBLICATIONS

Preinterview First Office Action dated Sep. 16, 2020 in U.S. Appl. No. 16/920,061, 6 pages.

*Primary Examiner* — Seyed H Azarian
(74) *Attorney, Agent, or Firm* — Kilpatrick Townsend & Stockton LLP

(57) ABSTRACT

A method of image analysis is provided for recognition of a pattern in an image. The method includes receiving a plurality of images acquired by a camera, where the plurality of images include a plurality of optical patterns in an arrangement. The method also includes matching the arrangement to a pattern template, wherein the pattern template is a predefined arrangement of optical patterns. The method also includes identifying an optical pattern of the plurality of optical patterns as a selected optical pattern based on a position of the selected optical pattern in the arrangement. The method also includes decoding the selected optical pattern to generate an object identifier and storing the object identifier in a memory device.

20 Claims, 14 Drawing Sheets

(56) References Cited

U.S. PATENT DOCUMENTS

| | | | |
|---|---|---|---|
| 2016/0307006 A1* | 10/2016 | Wang | G06K 7/1417 |
| 2017/0032311 A1* | 2/2017 | Rizzolo | G06K 9/183 |
| 2019/0188435 A1* | 6/2019 | Davis | G07G 1/0045 |
| 2019/0244043 A1* | 8/2019 | Bradley | H04N 19/90 |
| 2019/0325183 A1* | 10/2019 | Tscherepanow | G06N 3/08 |

* cited by examiner

RECOGNITION AND SELECTION OF DISCRETE PATTERNS WITHIN A SCENE OR IMAGE

CROSS REFERENCE TO RELATED APPLICATIONS

This application claims priority to and the benefit of U.S. Provisional Patent Application No. 63/003,675, filed Apr. 1, 2020, U.S. Provisional Patent Application No. 63/019,818, filed May 4, 2020, and U.S. Provisional Patent Application No. 63/017,493, filed Apr. 29, 2020, the disclosures of which are incorporated by reference for all purposes.

BACKGROUND

This disclosure generally relates to decoding optical patterns in a scene or image, and more specifically, and without limitation, to decoding barcodes. Barcodes have traditionally been scanned using a specialized scanner. For example, a barcode scanner comprising a laser is used to shine light on a barcode, and reflected light from the barcode is detected and used to decode the barcode. As mobile devices (e.g., smartphones and tablets) with cameras have become more common, mobile devices are being used to decode codes by acquiring an image of a code and using image analysis to decode the code. An example of a method for using as smartphone to decode a barcode is provided in U.S. Pat. No. 8,596,540, granted on Dec. 3, 2013.

BRIEF SUMMARY

Techniques described herein include systems and corresponding methods for the automated analysis of an image for recognition of a pattern. In particular, included herein are systems that transform an image for the purpose of measuring significant characteristics of the image. The images analyzed and processed herein are images that are representative of a "real" scene (such as images obtained by a camera, scanner, or image detector), including obtained images of places and things, wherein the image represents the actual scene. Images are analyzed to correctly identify a discrete pattern as a member of a predefined pattern category. The image analyzing system possesses a further capability of identifying discrete patterns viewed within a scene or image and of assigning patterns to appropriate categories as determined by resident categorization rules. Mobile devices having data connections and cameras, and being capable of hosting many mobile applications, offer a flexible and scalable solution for optical pattern decoding. Such devices detect and decode an optical pattern appearing in a real scene, rather than a single optical pattern isolated from its environment. Scenes also may include multiple optical patterns to be distinguished when the scene includes different types of optical patterns, different orientations, different arrangements, or many optical patterns encoding multiple different types of information. Selection of a single optical pattern appearing in a real scene is not straightforward, and may include careful staging to limit and/or control the orientation, position, and placement of the selected optical pattern in the camera field of view.

In certain embodiments, a method for image analysis for recognition of a pattern in an image includes receiving a plurality of images acquired by a camera, the plurality of images including a plurality of optical patterns in an arrangement. The method further includes matching the arrangement to a pattern template, wherein the pattern template is a predefined arrangement of optical patterns. The method further includes identifying an optical pattern of the plurality of optical patterns as a selected optical pattern based on a position of the selected optical pattern in the arrangement. The method further includes decoding the selected optical pattern to generate an object identifier. storing the object identifier in a memory device.

Optionally, the plurality of optical patterns are barcodes, constructed of parallel bars.

Optionally, the plurality of optical patterns are disposed on a label affixed to an object in the plurality of images, and the method further includes calculating a physical dimension of the object. Optionally calculating the physical dimension of the object includes calculating a relative dimension of the object in an image to a relative dimension of the label in the image, and calculating the physical dimension of the object based on the relative dimension of the object. Optionally, the method further includes comparing the physical dimension of the object to an expected physical dimension of the object associated with the object identifier, matching the object to the object identifier, and presenting a graphical element on the display indicating a match.

Optionally, the physical dimension of the object includes at least one of a volume of the object or a weight of the object. Optionally, the method includes ascertaining a logistical criterion based on the physical dimension. Optionally, the logistical criterion includes at least one of a postage rate, an inventory order identifier, a packing order, or a warehouse location identifier.

Optionally, the method further includes identifying a first template identifier pattern in a first image of the plurality of images, the first template identifier pattern being an identifier of the pattern template, identifying a second template identifier pattern in a second image of the plurality of images, matching the second template identifier pattern to a second pattern template, wherein the second pattern template is a second predefined arrangement of optical patterns, identifying a second selected optical pattern based on the position of the selected optical pattern in the arrangement, decoding the second selected optical pattern to generate a second object identifier, storing the second object identifier in the memory device.

Optionally, the method further includes presenting the plurality of images including the pattern template on a display, presenting a visual indication of the pattern template on the display, and presenting a graphical element overlaid on the selected optical pattern.

In certain embodiments, a method for of image analysis for recognition of a pattern in an image containing multiple patterns includes receiving a plurality of images acquired by a camera, the plurality of images including a plurality of optical patterns. The method further includes presenting the plurality of optical patterns on a display. The method further includes identifying a selected optical pattern of the plurality of optical patterns based on a user action and a position of the selected optical pattern in one or more of the plurality of images. The method further includes presenting on the display a visual indication of the selected optical pattern. The method further includes decoding the selected optical pattern to generate an object identifier. The method further includes indicating, via the visual indication, that the selected optical pattern has been decoded. The method further includes storing the object identifier in a memory device.

Optionally, the plurality of optical patterns include a first optical pattern and a second optical pattern, the first optical pattern is the selected optical pattern, and the second optical pattern is not decoded. Optionally, the user action includes a screen touch on the display. Optionally, the user action includes a screen touch on a region of the display corresponding to an optical pattern of the plurality of optical patterns. Optionally, the method further includes receiving a user interaction with a region of the display and magnifying an area of the plurality of images corresponding to the region by a predefined magnification factor.

Optionally, the method further includes presenting one or more graphical elements overlaid on the plurality of images. Optionally, the user action includes a screen touch on a second graphical element configured to trigger a selection of an optical pattern of the plurality of optical patterns and the selected optical pattern is an optical pattern of the plurality of optical patterns overlaid by the highlighted region. Optionally, the method further includes receiving a second screen touch on the second graphical element, after the screen touch on the second graphical element, selecting a second selected optical pattern of the plurality of optical patterns overlaid by a second highlighted region presented as a second overlay on a second optical pattern of the plurality of optical patterns, decoding the second selected optical pattern to generate a second object identifier, and storing the second object identifier in the memory device. Optionally, the display is part of a computing device that includes a housing, the user action is a tap on an exterior surface of the housing, and the method further includes identifying the selected optical pattern based on the selected optical pattern being presented with the visual indication at a time coincident with user action. Optionally, the visual indication comprises object information based on the object identifier. Optionally, the visual indication comprises a dynamic graphical element indicating decoding progress as a progress bar. Optionally, the visual indication comprises a dynamic graphical element presenting time since decoding by incrementally increasing a transparency of the visual indication over a period of time.

Optionally, the method further includes presenting a graphical element of the one or more graphical elements at a first position in the plurality of images corresponding to a first optical pattern of the plurality of optical patterns, in response to a second user action, repositioning the graphical element from the first position to a second position in the plurality of images corresponding to a second optical pattern of the plurality of optical patterns, identifying the selected optical pattern is based on a correspondence between the graphical element and the selected optical pattern at a time coincident with the user action.

In certain embodiments, a method for of image analysis for recognition of a pattern in an image containing multiple patterns includes receiving a plurality of images acquired by a camera, the plurality of images comprising a plurality of optical patterns, presenting the plurality of images on a display in a sequence according to a framerate, receiving a freeze action, freezing an image of the plurality of images on the display, based on receiving the freeze action, receiving an unfreeze action, and resuming the presentation of the plurality of images on the display based on receiving the unfreeze action, according to the framerate. Optionally, the freeze action is a tactile interaction with the display comprising a double tap on the display. Optionally, the unfreeze action comprises a repetition of the freeze action.

Optionally, the method further includes identifying a selected optical pattern of the plurality of optical patterns based on a user select action and a position of the selected optical pattern in one or more of the plurality of images, presenting on the display a visual indication of the selected optical pattern, decoding the selected optical pattern to generate an object identifier, indicating, via the visual indication, that the selected optical pattern has been decoded, and storing the object identifier in a memory device. Optionally, the user select action is a user interaction with a device comprising the display. Optionally, the method further includes decoding the plurality of optical patterns to generate a plurality of object identifiers and storing the plurality of object identifiers in the memory device. Optionally, the plurality of optical patterns are arranged according to a predefined arrangement of optical patterns, identifying the selected optical pattern comprises identifying the predefined arrangement of optical patterns, the user select action is a screen touch in a region of the display over the predefined arrangement of optical patterns, and presenting the visual indication comprises at least one of an indication of the predefined arrangement of optical patterns or a plurality of visual indications corresponding to the plurality of optical patterns. Optionally, the method further includes presenting a graphical element on the display, the graphical element superimposed at a position of the plurality of images, identifying a selected optical pattern of the plurality of optical patterns based on the graphical element being superimposed over the selected optical pattern in one or more of the plurality of images, presenting on the display a visual indication of the selected optical pattern, decoding the selected optical pattern to generate an object identifier, indicating, via the visual indication, that the selected optical pattern has been decoded, and storing the object identifier in a memory device.

Optionally, the method further includes ascertaining a first number of optical patterns of the plurality of optical patterns in a first image of the plurality of images, ascertaining a second number of optical patterns of the plurality of optical patterns in a second image of the plurality of images, ascertaining a change extent between the first number and the second number, comparing the change extent to a threshold change criterion, if the change extent satisfies the threshold change criterion, generating the freeze action. Optionally, the method further includes generating the unfreeze action after a period of time has elapsed. Optionally, the second image corresponds to a second position in the sequence of frames following a first position in the sequence of frames corresponding to the first image. Optionally a separation between the first position and the second position corresponds to a period of time according to a framerate. Optionally, the period of time is 300 ms.

Optionally, the method further includes identifying an application, executed on a device including the camera and the display, the application being configured to generate the plurality of images using the camera, identifying an application framerate of the application, determining the first position and the second position according to the application framerate and a predetermined time period. Optionally, the method further includes identifying a device framerate of the device and determining the first position and the second position according to the device framerate and a predetermined time period. Optionally, the method further includes ascertaining a plurality of device parameters in real time describing at least one of the device, the camera, or a user or a user of the device, wherein determining the first position and the second position includes calculating an updated time period using the plurality of device parameters and redetermining the second position and the first position, according to the device framerate, to correspond to the updated time period.

Optionally, the method further includes decoding the plurality of optical patterns to generate a plurality of object identifiers, ascertaining a number of object identifiers corresponding to the plurality of object identifiers, ascertaining that the number of object identifiers satisfies a threshold criterion, identifying a selected image of the plurality of images including the plurality of optical patterns based on the number of object identifiers satisfying the threshold criterion, presenting the selected image on the display. Optionally, the threshold criterion is a change extent of the number of object identifiers, including a variation parameter in the number of object identifiers over a period of time. Optionally, the method further includes presenting a first object identifier of the plurality of object identifiers, presenting first object information associated with the first object identifier on the display, in response to a second user action, presenting a second object identifier of the plurality of object identifiers on the display and removing the first object identifier and the first object information from the display, presenting second object information associated with the second object identifier.

Optionally, the visual indication includes object information based on the object identifier. Optionally, the visual indication includes a dynamic graphical element indicating decoding progress as a progress bar. Optionally, the visual indication includes a dynamic graphical element presenting time since decoding by incrementally increasing a transparency of the visual indication over a period of time.

In certain embodiments, a method for image analysis for recognition of a pattern in an image includes receiving a plurality of images acquired by a camera, the plurality of images comprising a plurality of optical patterns, detecting the plurality of optical patterns, and providing an auditory prompt comprising a sound recording, the sound recording comprising information describing the optical patterns.

Optionally, the plurality of images is a first plurality of images, the first plurality of images including an image border and a partial optical pattern adjacent to the image border, and the method further includes ascertaining an orientation of the partial optical pattern relative to the image border, generating a first prompt, as playback of a first recorded sound, to move the camera in a first direction based on the orientation, receiving a second plurality of images acquired by the camera, the second plurality of images including a complete optical pattern corresponding to the partial optical pattern, decoding the complete optical pattern to generate an object identifier, providing a second prompt, as playback of a second recorded sound, to indicate successful decoding of the complete optical pattern, and storing the object identifier in a memory device.

Optionally, the method further includes decoding one or more optical patterns in a first image of the first plurality of images, decoding of one or more optical patterns in a second image of the second plurality of images, the one or more optical patterns in the first image being different from the one or more optical patterns in the second image. Optionally, the method further includes presenting the first plurality of images on a display, presenting a first graphical element on the display, the first graphical element indicating the partial optical pattern, presenting the second plurality of images on the display, presenting a second graphical element on the display, the second graphical element indicating the complete optical pattern.

Optionally, the method further includes presenting, on a display, a highlighted region overlaid on the plurality of images corresponding to an optical pattern of the plurality of optical patterns. Optionally, the method further includes identifying a selected optical pattern of the plurality of optical patterns, decoding the selected optical pattern to generate an object identifier, providing a second auditory prompt to indicate successful decoding of the selected optical pattern, ascertaining object information based on the object identifier and generating a third auditory prompt including the object information. Optionally, the method further includes presenting, on a display, a visual indication comprising the object information, receiving, via a microphone, a vocal command comprising a confirmation instruction, and storing the object identifier in a memory device, in response to recognizing the confirmation instruction.

Optionally, the method further includes selecting an optical pattern appearing in the plurality of images, identifying an image of the plurality of images such that the image contains the optical pattern at a resolution satisfying a threshold resolution and decoding the optical pattern in the image.

Optionally, the method further includes identifying a predefined arrangement of optical patterns in the plurality of images, identifying a selected optical pattern of the predefined arrangement of optical patterns, based at least in part on a position of the selected optical pattern in the predefined arrangement, detecting the selected optical pattern in an image of the plurality of images, decoding the selected optical pattern to generate an object identifier and storing the object identifier in a memory device.

Optionally, the method further includes providing a second auditory prompt including the object identifier, receiving, via a microphone, a vocal command comprising a confirmation instruction, and storing the object identifier in the memory device, in response to recognizing the confirmation instruction.

Optionally, the method further includes receiving, via a microphone, a vocal command comprising an inventory quantity and storing the inventory quantity in the memory device in association with the object identifier, in response to recognizing the vocal command. Optionally, the method further includes presenting, on a display, a visual indication comprising the vocal command, providing a third auditory prompt comprising the inventory quantity, and receiving, via the microphone, a second vocal command comprising a confirmation instruction.

In certain embodiments, a system includes a memory configured to store computer-executable instructions and one or more processors in communication with the memory and configured to execute the computer-executable instructions, where the computer executable instructions configure the one or more processors to perform one or more steps included in the methods described in reference to the preceding embodiments.

In certain embodiments, a computer-readable storage medium stores computer-executable instructions that, when executed by one or more processors of a computer system, cause the computer system to perform one or more steps included in the methods described in reference to the preceding embodiments.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Generally, optical pattern detection, selection, and decoding is described in the context of discrete optical patterns appearing in a real scene including multiple patterns, objects, and people in a real environment. As an illustrative example, a mobile electronic device, such as a smartphone or tablet, captures and/or receives images taken using a camera. The images include, among other elements of the field of view of the camera, multiple optical patterns, such as barcodes. The user of the mobile electronic device selects one or more of the patterns for decoding, aided by graphical elements on the display of the device that facilitate the selection and processing. After selecting a pattern in the images, the pattern is decoded and the encoded information is stored, either on the device or in an online memory system. The techniques described herein may be applied to manual selection by a user of a mobile device, as well as automatic selection. Similarly, the images received by the device may be frozen to facilitate selection, with freezing being manually and/or automatically triggered. To permit hands-free and accessible operation, audio prompts and voice recognition may be included to permit selection without interaction with the display.

The techniques described in the following paragraphs, in reference to the appended figures, constitute multiple technical improvements of optical pattern processing and selection. For example, computation resources may be conserved by decoding patterns after selection, rather than immediately upon recognition. As another example, implementing template-based automatic selection, only a fraction of optical patterns need be decoded for each selection, with potential for significant improvement of processor utilization and power consumption of systems employed in image analysis for optical pattern recognition and decoding in real scenes.

Figure 1:
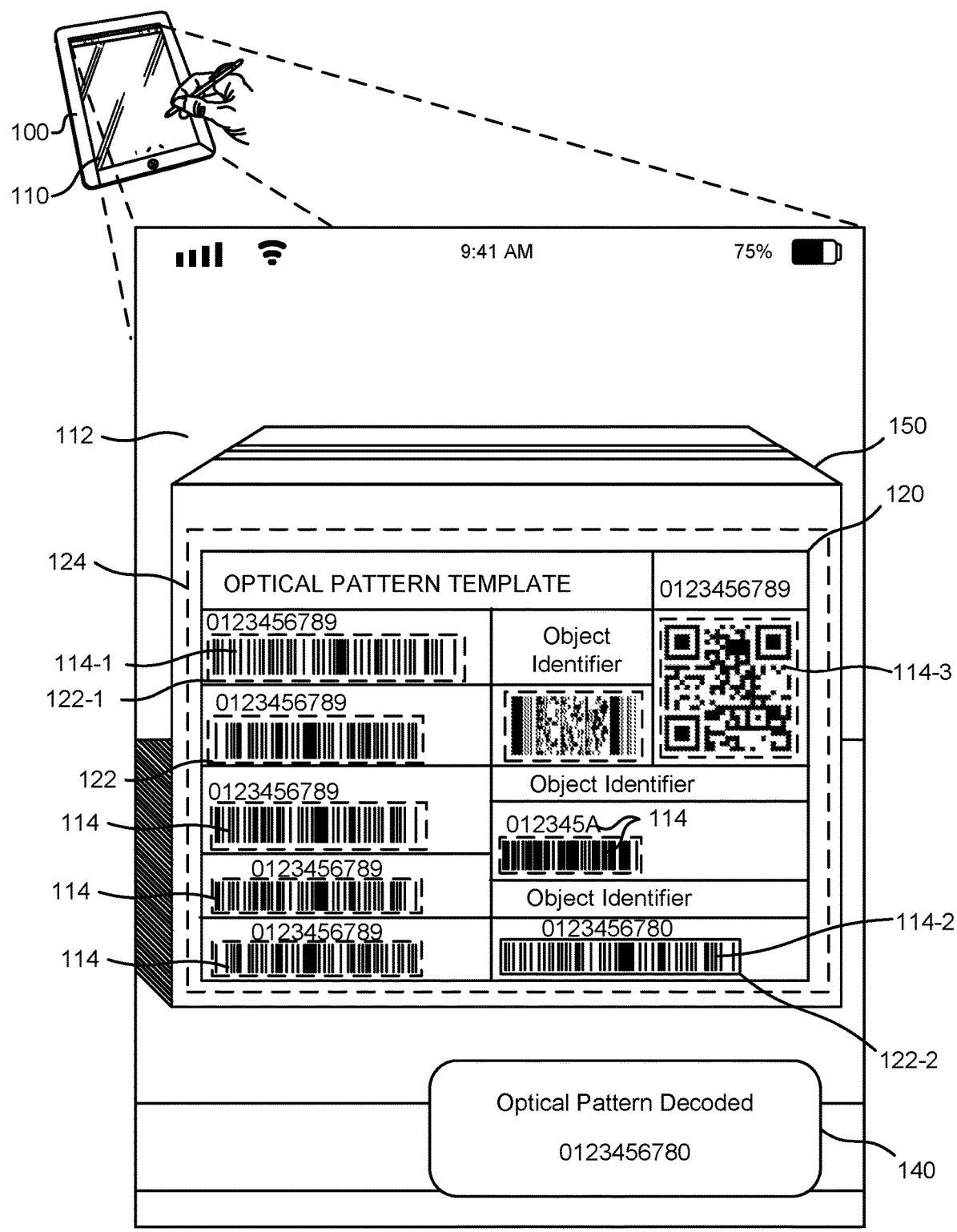
FIG. 1 depicts an example technique for automated recognition of a pattern in an image containing multiple patterns, in accordance with some embodiments of the present disclosure.

FIG. 1 depicts an example technique for automated recognition of a pattern in an image containing multiple patterns, in accordance with an embodiment of the present disclosure. In the example technique, a system 100 having a display 110 presents a plurality of images containing multiple optical patterns 114 arranged in an optical pattern template 120. FIG. 1 depicts a first optical pattern 114-1, a second optical pattern 114-2, and a third optical pattern 114-3, among other optical patterns 114. As illustrated, the plurality of images depict a real world scene as viewed through a field of view (FOV) of a camera. The real world scene may include multiple objects, patterns, or other elements (e.g., faces, images, colors, etc.) of which the optical patterns 114 are only a part. In some embodiments, an image 112 may be captured by a camera and/or provided via additional or alternative system processes (e.g., from a memory device, a communications connection to an online content network, etc.). The optical patterns 114 are detected and/or recognized in the image 112, from which the system 100 determines an arrangement of the optical patterns 114. In the context of this disclosure, detection and recognition of optical patterns may describe different approaches for image analysis of optical patterns. Detection may describe detecting an optical pattern in an image by characteristic discrete patterns (e.g., parallel bars or symbols). Recognition may include additional analysis of the pattern that provides descriptive and/or characteristic information (e.g., an optical pattern type) specific to the optical pattern, but does not necessarily include decoding the optical pattern. For example, a barcode may be detected in an image based on image analysis revealing a region of the image containing multiple parallel bars. After additional analysis, the barcode may be recognized as a UPC code. In some embodiments, detection and recognition are concurrent steps implemented by the same image analysis process, and as such are not distinguishable. In some embodiments, image analysis of optical patterns proceeds from detection to decoding, without recognition of the optical pattern. For example, in some embodiments, a similar approach can be used to detect a pattern of characters and in a second step decode the characters with optical character recognition (OCR).

In some embodiments, the arrangement of optical patterns 114 is characteristic of a given template category, such that each of the optical patterns 114 encodes a different respective piece of object information describing an object 150, or information related to the object, on which the optical pattern template 120 is found in the image 112 (e.g., as a label, printed template, etc.). The system 100 matches the arrangement of the optical patterns 114 to an optical pattern template category to identify the optical pattern template 120. In some embodiments, the optical pattern template 120 may include optical patterns 114 of several types, and, as illustrated, may also include a combination of barcodes, alphanumeric characters, other types of discrete patterns, etc. The optical pattern template 120 may include, but is not limited to VIN numbers, passports and ID cards, VDA labels, and/or shipping labels. As such, decoding of the optical patterns 114 may implement techniques including, but not limited to, barcode sequencing, optical character recognition (OCR), and/or image analysis of two-dimensional patterns.

Identifying the optical pattern template permits automatic (e.g., without user interaction) generation and/or presentation on the display 110 of one or more graphical elements 122, which can be relevant to processing the optical patterns 114. In some embodiments, the graphical elements 122 may include, but are not limited to highlighted regions, boundary lines, bounding boxes, dynamic elements, or other graphical elements, overlaid on the image 112 to emphasize or otherwise indicate the positions of the optical patterns 114 in the plurality of images. In FIG. 1, a first graphical element 122-1 is a dashed line overlay surrounding the first optical pattern 114-1, indicating to a user that a location of the first optical pattern 114-1 is identified, but that the first optical pattern 114-1 is not necessarily decoded. Similarly, the display 110 may present a template indicator 124 to emphasize the location of the optical pattern template 120 in the plurality of images. As illustrated, each optical pattern 114 may be presented with one or more graphical element, such that the image 112 clearly shows the positions of the optical patterns 114.

As illustrated, the system 100 identifies one or more of the optical patterns 114 for decoding. As mentioned above, the decoding may be automated, initializing upon recognition of a pre-defined optical pattern template category. In some embodiments, the optical pattern template 120 includes a specific pattern of interest to a user of the system 100, such that the system 100 identifies the second optical pattern 114-2 as a selected optical pattern. Since the optical pattern template 120 presents the optical patterns 114 in a pre-defined arrangement, the selected optical pattern may be identified based on its relative position to the other optical patterns 114. For example, an object tracking label that follows a standard layout defined by a logistical delivery service (e.g., the United States Postal Service) will have defined positions for each type of information encoded as an optical pattern (e.g., a barcode constructed of parallel bars). Identifying the selected optical pattern may be achieved by decoding all the optical patterns in the label. Alternatively, it may be achieved by selecting a single optical pattern encoding the desired information, based on its relative location in the template, and only decoding the selected optical pattern. The automatic selection and decoding may permit the system 100 to recognize the selected optical pattern from amongst many optical patterns 114 in multiple different template categorys appearing in the image 112. For example, the optical pattern template category can be pre-defined and/or selected from a list of pre-programmed templates. When the optical pattern template 120 is detected and/or recognized, the selected optical pattern may be decoded without decoding optical patterns of types or in positions other than the pre-defined and/or selected types or positions. In some embodiments, the template category may be identified before visual recognition of codes or objects, after localization of some or all of the optical patterns or objects, or after decoding some or all of the codes or objects. For example, in some embodiments, identifying the template category can be based on the observed patterns and matching the arrangement of the observed patterns to a template category. In another example, in some embodiments, the template category may be identified based on an explicit identifier, as described below. In some embodiments, when the optical pattern template 120 is viewed at a low angle or is otherwise skewed and/or distorted in the image 112, image processing techniques applied to the plurality of images can determine the layout of the optical pattern template 120 (e.g., by plano-rectification) and recognize and/or decode the optical patterns 114.

Subsequent to selection and/or decoding, a second graphical element 122-2 may be generated and/or presented in the display 110 to indicate the selected optical pattern. For example, the second graphical element 122-2 may include, but is not limited to, a closed bounding box, a highlighted region of a different color, a dynamic display feature, and/or object identifier information encoded in the selected optical pattern and/or associated with the selected optical pattern. As an example, the second graphical element 122-2 may be a green closed box overlaid on the image and surrounding the selected optical pattern. Similarly, object identifier information, selected optical pattern status, or other information to facilitate the processing of the selected optical pattern may be included in a status element 140, generated and/or presented via the display 110 at various stages of optical pattern recognition, selection and/or decoding. For example, after recognition, the status element 140 may include information about the optical pattern template category or the number of patterns detected. Following selection and/or decoding, the status element 140 may present information specific to the selected optical element.

In some embodiments, for example, when the optical pattern template 120 is described by a standard template size (e.g., a shipping label having standard dimensions), the dimensions of the object 150 in the image 112 with the optical pattern template 120 can be ascertained. This can be used to assess one or more secondary characteristics of the object 150 including, but not limited to postage requirements, item verification (e.g., sizing objects to estimate volume), and/or weight (if the object 150 has been identified). For example, when the selected optical pattern provides an object identifier that is linked to an item information database, the system 100 may receive an expected physical dimension of the object 150. The system 100 may match the object 150 in the image 112 to the selected optical pattern by comparing the expected physical dimension to a corresponding secondary characteristic of the 150. As an example, the volume of the object 150 may be estimated based on the relative dimension of the object 150 in the image 112 and compared to an expected volume received from a database according to the object identifier. In some embodiments, the display 110 may present a graphical element to indicate whether the object 150 matches the selected optical pattern. In some embodiments, estimating the secondary characteristic may permit the system 100 to ascertain a logistical criterion. For example, calculating the volume and weight of the object 150 may permit the system to calculate a postage rate for shipping the object 150. As another example, in a warehouse or other logistical operation, the volume and weight may permit the system 100 to ascertain a packing order of the object 150 (e.g., by implementing a packing algorithm to optimize the volume of a shipping container), a storage location (e.g., heavy objects may be directed to lower shelves for storage), or a warehouse location (e.g., to implement optimization routines used for storage and sorting of objects). In some embodiments, the system 100 may receive depth information, for example, from a time-of-flight depth sensor or other form of position detection system, from which accommodation may be made for the distance between the template and the object 150. For example, when the optical pattern template 120 has a standard size, comparing the relative dimension of the optical pattern template 120 to the dimension of the object 150 in the image 112 can permit the system 100 to calculate the physical dimension of the object.

Identifying the optical pattern template 120 permits optical patterns 114 to be decoded only once. Optical pattern templates may be standardized or specific to a company, purpose, or usage. For example, two logistical services companies may use different layout, even though both companies may use shipping labels for processing parcels. The optical pattern template 120 may include information about the type of encoding, including, but not limited to, 1-d barcodes, 2-d optical patterns, machine readable characters, etc. The template may also include information about the parsing and meaning of the various decodable objects.

In some embodiments, the optical pattern template 120 includes a third optical pattern 114-3 that is a template identifier pattern (e.g., as shown in FIG. 1, a QR code) that identifies the optical pattern template 120 itself, rather than the constituent optical patterns 114. As such, the template identifier pattern may be decoded to identity the optical pattern template 120, and the constituent optical patterns 114 may be assumed static unless the template identifier pattern 130 changes. In this way, decoding the optical patterns 114 can be reserved for new optical pattern templates detected and/or recognized in the image 112 (also referred to as "sparse decoding"). For example, in a real scene containing multiple objects (e.g., object 150 of FIG. 1) bearing different optical pattern templates (e.g., optical pattern template 120 of FIG. 1), the plurality of images may contain multiple optical pattern templates and/or the camera may be moved such that different optical pattern templates are imaged at different times. In this example, a template identifier pattern may be decoded to identify the optical pattern template, after which point the constituent optical patterns making up the optical pattern template need only be decoded once. When the camera moves to a second object bearing a different optical pattern template (e.g., as a label, marking, etc.) the system may automatically detect that the template identifier pattern has changed, and may decode the constituent optical patterns making up the new optical pattern template. In another example, objects may move through the camera field of view (e.g., in a conveyor-belt system), at which point the template identifier pattern is detected, decoded, and causes the constituent optical patterns to be processed for decoding of the selected optical pattern.

In some embodiments, the template may also include information about how to parse information from the decoded information. For example, a template identifier pattern, when decoded, may include multiple separate pieces of information within a single number string. For example, in some embodiments, a a template identifier pattern may encode a unique serial number (e.g., identifying the object and/or the template), a model number, and a manufacturing date code. Parsing information may permit the consuming application to extract such identifying information from the decoded number string.

Figure 2:
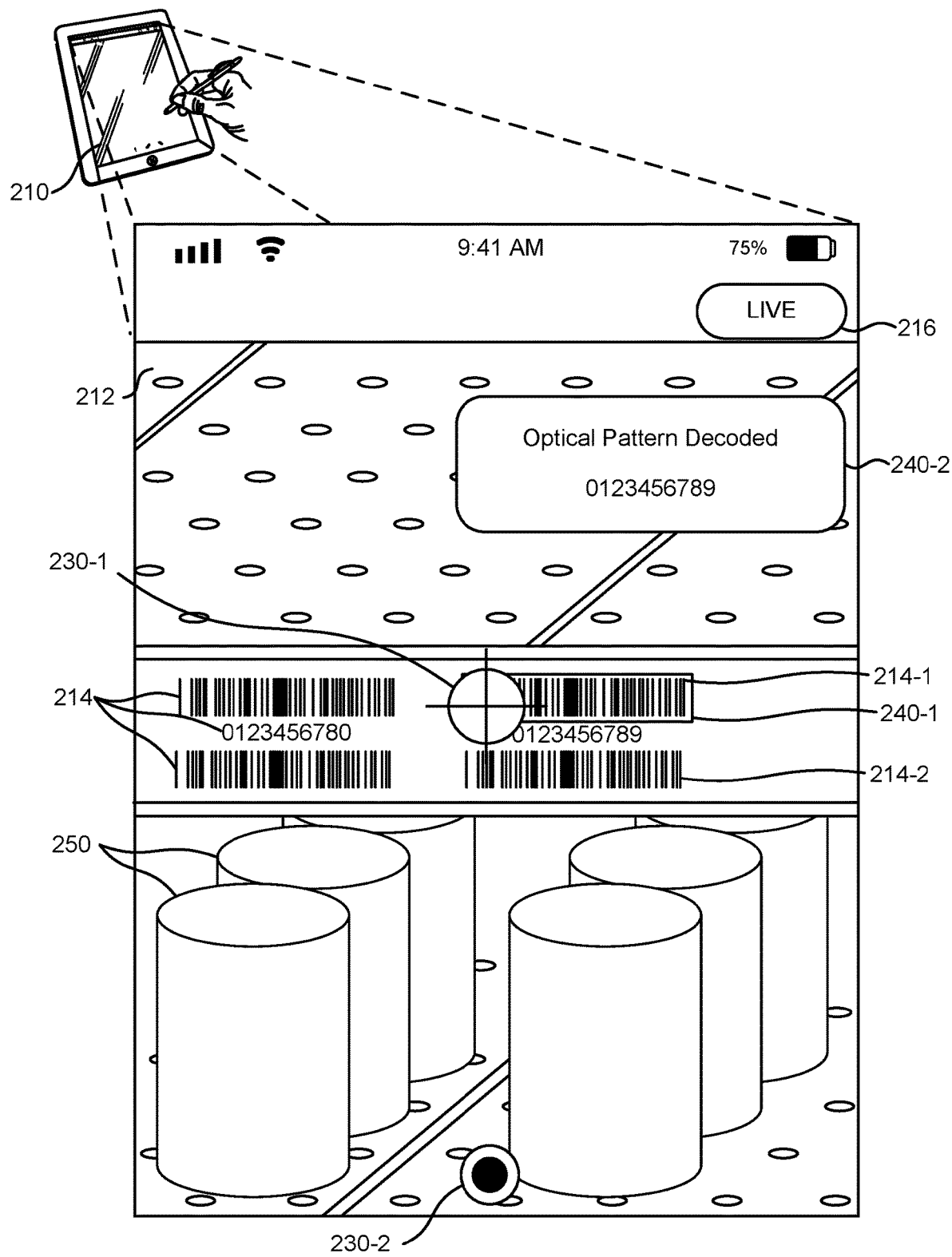
FIG. 2 depicts an example technique for automated recognition and manual selection of a pattern in an image containing multiple patterns, in accordance with some embodiments.

FIG. 2 depicts an example technique for automated recognition and manual selection of a pattern in an image containing multiple patterns, in accordance with some embodiments. In FIG. 2, a display 210 presents a camera field of view (FOV) of a real scene containing multiple optical patterns 214. When a plurality of images are captured by a camera and presented in "real time" (e.g., presented on the display 210 in a sequential manner following capture, albeit potentially with some latency introduced by system processes), the display may include an image 212 and a live indicator 216 or other graphical element to indicate that the display 210 is being refreshed. For example, the live indicator 216 may be a red circle in an upper corner of the image 212 with the word "LIVE" within the circle.

To facilitate processing the optical patterns 214, the display may include one or more graphical elements 230, including a first graphical element 230-1 and a second graphical element 230-2. For example, a first graphical element 230-1, as shown in FIG. 2, may be a reticle that is presented at a position of the display 210 (e.g., centered in the middle of the display). The reticle may permit the user to indicate a first optical pattern 214-1 as a selected optical pattern. For example, a selection may be made by centering the FOV on the selected optical pattern such that the image 112 shows the selected optical pattern beneath the reticle. As described in more detail in reference to FIG. 1, the display 210 can also include highlighting, bounding boxes, or other graphical elements to identify which optical pattern is being selected (e.g., second graphical element 122-2 of FIG. 1). For example, holding the reticle over an optical pattern 214 for a defined number of images (or an equivalent length of time), can serve as a selection confirmation. In some embodiments, a second optical pattern 214-2 is not selected, and as such may not be decoded. In some embodiments, multiple optical patterns may be selected, and may be decoded accordingly.

The display 210 may include the second graphical element 230-2 in a form analogous to a shutter control (e.g., FIG. 2 shows the second graphical element 230-2 as a capture button) that identifies a region of the display 210 that is configured to receive a user action including, but not limited to a screen touch (e.g., using a finger tap or a stylus). The shutter control may facilitate the selection of an optical pattern 114 under the reticle.

As described in more detail in reference to FIG. 1, the selected optical pattern may be identified, marked, and/or otherwise indicated on the display 210 by one or more graphical elements 240, including a first graphical element 240-1 represented by a bounding box in FIG. 2. The graphical elements 240 may also include, but are not limited to, highlighting, outlining, or a graphical overlay with the decoded object information corresponding to the selected optical pattern. For example, the optical patterns 214 may be highlighted in a first color (e.g., white or grey) when recognized in the image 212, whereupon the color may change to a second color (e.g., green) when the selected optical pattern has been decoded. In some embodiments, the graphical elements may include dynamic augmented reality features, as described in more detail below. For example, a second graphical element 240-2 may present a visual indication of decoding and may be generated and/or presented following decoding of the selected pattern. The visual indication of decoding may include object identifier information (e.g., descriptive information associated with the item referenced by the selected optical pattern) of one or more objects 250 identified by the optical patterns 214. For example, the object identifier information may be linked to a database of object information that is received and presented on the display 210 following decoding of the selected optical pattern.

In some embodiments, AR features can provide additional functionality and user experience improvements. For example, optical pattern metadata can be surfaced to indicate whether an optical pattern has been successfully scanned, recognized, and/or decoded. Similarly, AR features may indicate whether the selected optical pattern is associated with an object and/or item in a linked database (e.g., an inventory database) to facilitate identification and selection of the selected optical pattern. Similarly, the AR features may include hypertext and/or dynamic web-content linking to online marketplace, item information, or other interfaces. While an optical pattern on an object (e.g., objects 250 of FIG. 2) is often accompanied by alphanumeric object information including an object name and other characteristic information, the shelf label may be not include such identifier information. For that reason, AR features may indicate whether the selected optical pattern and the object in the image 212 are corresponding (e.g., a shopper is holding a can of caviar, but selects the optical pattern for a can of tuna). This may include recognizing multiple optical patterns 214 in the image 212 (e.g., a label optical pattern and a shelf optical pattern) and surfacing AR features indicating a mismatch. The information presented in AR features can be dynamic to provide intuitive information about the decoding process. This can include a progress bar type color shift, a fading of the AR feature over time, etc. For example, the AR features can indicate time since decoding by incrementally increasing the transparency of a graphical element over time (e.g., fading the AR feature). The AR features can guide the manual selection techniques described above. For example, AR features can be used to highlight recognized optical patterns based on shape or length, to call out to the user to consider those optical patterns.

Figure 3:
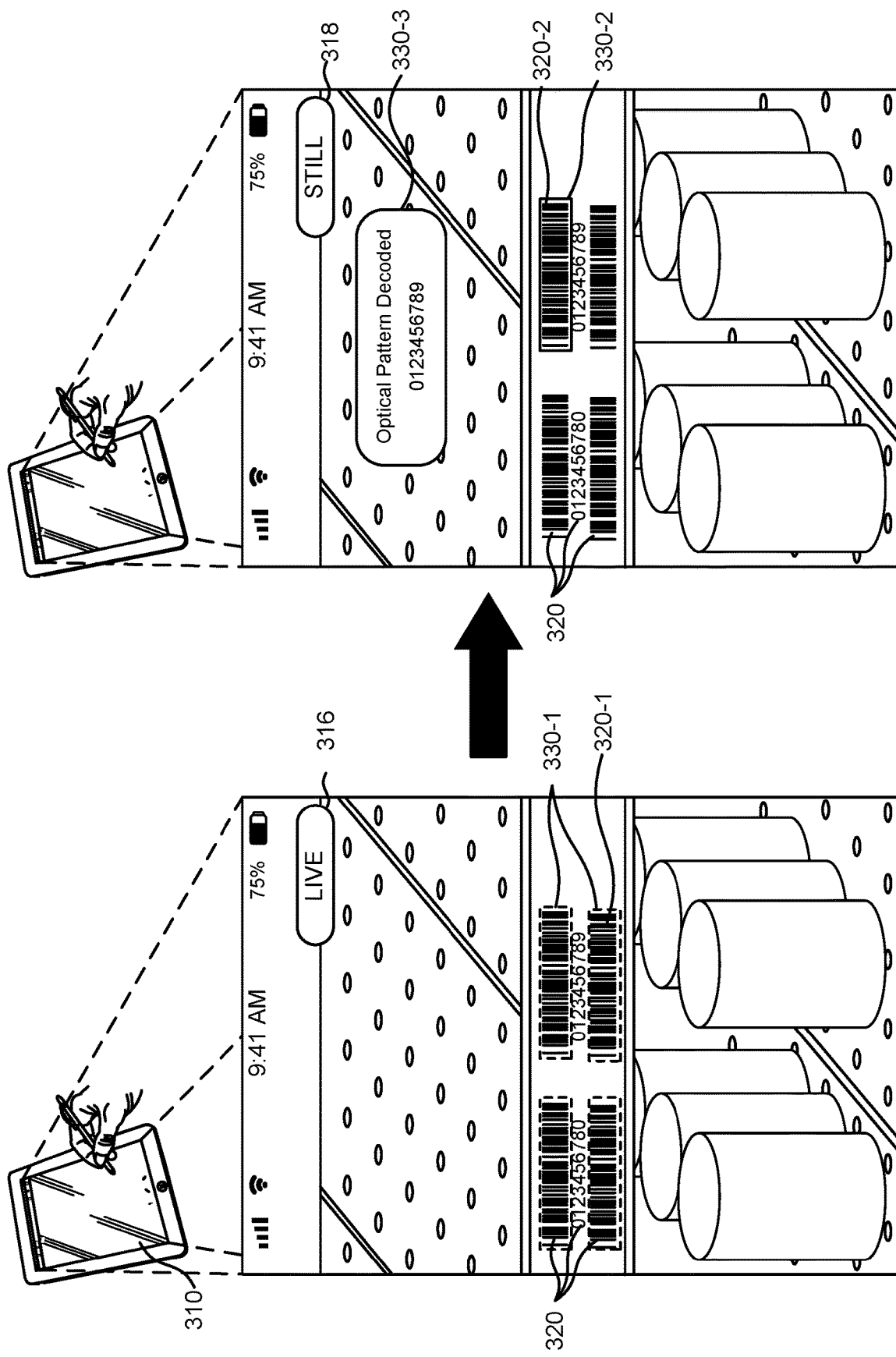
FIG. 3 depicts an example technique for freezing an image containing multiple patterns to facilitate selection of a pattern in the image, in accordance with some embodiments.

FIG. 3 depicts an example technique for freezing an image containing multiple patterns to facilitate selection of a pattern in the image, in accordance with some embodiments. In a real scene containing multiple optical patterns and other objects, selection of a particular optical pattern may be facilitated by freezing an image presented in a display 310 for a period of time. As described in reference to FIGS. 1-2, multiple optical patterns 320 may be recognized in the image (e.g., image 212 of FIG. 2). In FIG. 3, a first optical pattern 320-1 is a barcode constructed of parallel lines. The multiple optical patterns 320 may be emphasized and/or indicated by one or more graphical elements 330. In FIG. 3, a first graphical element 330-1 is a dashed line overlay surrounding a first optical pattern 320-1, indicating to a user that a location of the first optical pattern 320-1 is identified, but that the first optical pattern 320-1 is not necessarily decoded. The display 310 may also include a visual indication (e.g., a live indicator 316 or another graphical element overlaid on the image) showing that the display 310 is presenting live images. For example, freezing the image may facilitate identification of the second optical pattern 320-1 as a selected optical pattern. Freezing the image can be used when the optical patterns 320 are not individually resolved, are presented in a size that makes the use of the graphical elements described in reference to FIG. 2 (e.g., the reticle of FIG. 2) less effective, and/or while a user is unable to select an optical pattern 320 for decoding (e.g., the user is holding a mobile device high above the head and cannot see the display 310 entirely while acquiring an image of a scene, but can later select an optical pattern for selection and/or decoding by touching the display 310 where a graphical element 330 is located with respect to the display 310). In FIG. 3, a second graphical element 330-2 is a solid line overlay surrounding the second optical pattern 320-1, indicating to the user that the selected optical pattern has been selected and/or decoded (e.g., based on the user touching the display 310 at the second optical pattern 320-1). In FIG. 3, a third graphical element 330-3 is an AR feature and/or a visual indication of decoding success, as described in more detail in reference to FIGS. 1-2. For example, the third graphical element 330-3 may include the decoded object identifier and/or may present information associated with the selected optical pattern.

In some embodiments, freezing the image can be automatic or manual. For a manual freeze, a user action, such as a screen tap, double tap, or other interaction can set the display to freeze the scene. Once frozen, the display 310 may present a single image of the real scene and indicate that the scene is frozen using a still indicator 318. The selected optical pattern may be indicated with a second graphical element 330-2, as described in more detail in reference to FIGS. 1-2. Once the selected optical pattern is selected and/or decoded, a repeated and/or subsequent user action may return the display to "real time" presentation of the real scene (e.g., unfreezing the display). Release from the freeze may also happen automatically. For example, the scene may be frozen for a pre-defined time interval, following which the display 310 presents the scene in "real time" once again, corresponding to a mode where optical patterns 320 are detected, recognized, and/or decoded.

For automatic freeze, the display 310 may freeze and/or wait for a barcode selection based on one or more factors detected in the scene. For example, the number of optical patterns 320 in the image may change as a function of time (e.g., in "real time" mode), as when the display is moved around the environment. In some embodiments, when the number and/or information of the optical patterns 320 does not change within a pre-defined period of time (e.g. 300 ms, 0-500 ms, more than 500 ms, etc.), the display may automatically freeze on the image to facilitate selection of the selected optical pattern. Similarly, ascertaining a change in the number of decoded optical patterns (e.g., when the optical patterns 320 are all decoded regardless of selection) may cause the display to present a frozen image to facilitate selection of the selected optical pattern. Similarly, once a pre-defined and/or specified number of optical patterns (detected, recognized, or decoded) has been reached, the image may be automatically frozen.

In some embodiments, the display 310 presents a plurality of images presented in a sequence (e.g., a video). The sequence may correspond to a framerate, in frames-per-second, that can be used to describe the pre-defined period of time in terms of a number of images. As such, freezing may be initiated after the number and/or information of the optical patterns 320 has not changed after a specific number of frames. Since the framerate can be an operating parameter of the device producing the images, the number of frames can be a function of a specific device.

When the plurality of images are generated and/or received as part of a specific application (e.g., a mobile application or other form of computer-executable software) the number of frames or time interval to freeze the scene can be a function of the specific application. For example, the specific application may inform the number of frames or time interval when a specific application detects and/or recognizes and decodes a specific type of optical pattern in a real scene that contains optical patterns appearing at a known frequency (e.g., a logistical system where optical patterns appear at a set frequency, such as a conveyor belt). In such systems, the number of frames or time interval may be paired to system operating parameters that are known and/or defined outside the display 310. For this reason, both the freezing of the scene and the unfreezing of the scene may be automated, and paired to the specific application of the display 310. For example, in a luggage delivery conveyor system, the operation of a camera included in a mobile electronic device may be timed to coincide with the average number of baggage passing the position of the device on the conveyor per unit of time.

In some embodiments, the number of frames or time interval to freeze can be a dynamic parameter. For example, a Kalman filter can be used to estimate the time it takes for all the information to show up in a specific application, for a specific phone type, or for a specific user. Dynamic updating of automatic freeze time may provide additional advantages, including, but not limited to, increased system operational efficiency (e.g., by streamlining the selection of optical patterns), and may reduce computational demands by replacing the detection and/or decoding of the optical patterns 320 with a time delay before freezing, which could reduce the number of image processing operations. For example, rather than freezing the scene after detecting and/or decoding a predefined number of optical patterns 320, a time interval may be estimated based at least in part on filtered data for prior freezes and releases, such that an elapsed time interval may signal the freeze, instead of completing image processing operations.

Figure 4:
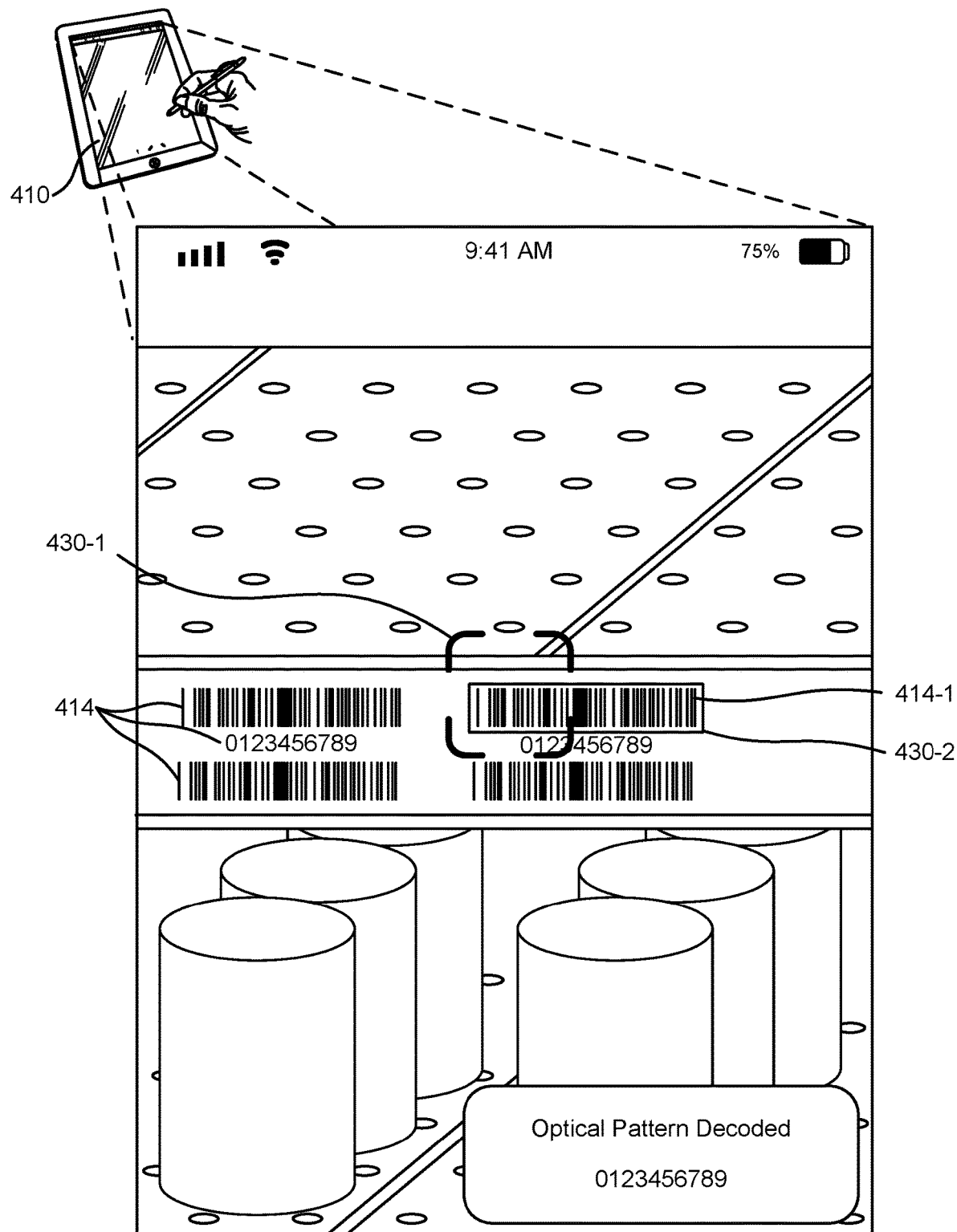
FIG. 4 depicts an example technique for automated recognition and selection of a pattern in an image containing multiple patterns using a graphical element for selection, in accordance with some embodiments.

FIG. 4 depicts an example technique for automated recognition and selection of a pattern in an image containing multiple patterns using a graphical element for selection, in accordance with some embodiments. As described in more detail in reference to FIGS. 2-3, graphical elements may be included and/or presented images depicting the camera field of view (FOV) of display 410 to facilitate processing and/or selection of one or more optical patterns 414. FIG. 2 described selection of a selected optical pattern (e.g., first optical pattern 214-1 of FIG. 2) in relation to one or more user actions used to indicate the location and/or timing of selection. Alternative techniques may facilitate the selection of an optical pattern by the use of one or more graphical elements. Such techniques may include, but are not limited to, automated selection based at least in part on the position of the graphical elements relative to the optical patterns 414 included in the image.

In some embodiments, the optical patterns 414 may be selected by moving a camera of the display 410 such that a first graphical element 430-1 is positioned over and/or adjacent to at least part of one of the optical patterns 414. For example, the first graphical element 430-1 may be a bounding box, where a selection of a first optical pattern 414-1 as a selected optical pattern, shown in FIG. 1 as a barcode, may be indicated when the bounding box overlays the first optical pattern 414-1 for a pre-defined period of time. In addition, the bounding box may be dynamic, such that when it is positioned over an optical pattern 414 it may change size to fit the size and/or aspect ratio of the selected optical pattern. The bounding box may change size and/or shape multiple times. For example, it may change from an open-sided box before selection is confirmed to a solid box after selection and/or decoding have completed. As described in more detail in reference to FIGS. 1-3, a second graphical element 430-2, shown in FIG. 4 as a solid line overlay on the selected optical pattern, may indicate to a user that an optical pattern has been selected and/or decoded. For example, the second graphical element 430-2 may be a green outline around the selected optical pattern.

The display 410 may be implemented in a mobile device, such as a smart phone, to facilitate user selection of the specific optical pattern (barcode, QR code, OCR, etc.) from among multiple optical patterns captured in an image taken using the camera of the mobile device. The selection may proceed by several methods. For example, selection may be automated. Selection of all visible optical patterns 414 is possible, with additional steps to determine if all detected optical patterns are associated with the same object/item.

For automated selection, the type of optical pattern may be specified programmatically, and the correct optical pattern may be selected by identifying the standard optical pattern type (e.g., by type, length, visual properties, etc.). For example, a user could select (e.g., from a drop-down menu) for a program to detect only code 128 and code 39 barcodes and ignore other optical patterns 414 types (e.g., exclude alphanumeric and QR codes). Graphical elements as dashed lines are placed around optical patterns 414 that are detected as a code 128 or a code 29 barcode. If the user moves the mobile device so that the first graphical element 130-1 is over, or primarily over, an optical code 414 (e.g., the first optical code 414-1) that is a code 128 or code 39 barcode for a predetermined number of frames, then the second graphical element 430-2 of a solid line is placed around the first optical code 404-1 indicating that the first optical code 404-1 is the selected optical code. A relative position of varying optical patterns in a standard template can also be used to select one of the optical patterns. This approach can be useful in cases where a standard multi-pattern label is used (assembly lines, shipping, infrastructure supply chains, etc.) as described in more detail in reference to FIG. 1.

In some embodiments, a method of image analysis for recognition of a pattern in an image includes receiving a target optical pattern type. The method also includes receiving a plurality of images acquired by a camera, the plurality of images containing a plurality of optical patterns. The method also includes matching a selected optical pattern of the plurality of optical patterns to the target optical pattern type and decoding the selected optical pattern to generate an object identifier. The method also includes storing the object identifier in a memory device. Optionally, matching the selected optical pattern to the target optical pattern type includes receiving a first relative dimension of the target optical pattern type, ascertaining a second relative dimension of the selected optical pattern, and matching the second relative dimension to the first relative dimension. Optionally, the target optical pattern type is a barcode constructed of parallel bars, a QR code, a MaxiCode, or an Aztec code.

Matching the selected optical pattern to the target optical pattern type can include receiving a characteristic dimension of the target optical pattern type. Once received, matching the selected optical pattern to the target optical pattern type may include ascertaining a plurality of spatial dimensions of the plurality of optical patterns, based on an arrangement of the plurality of optical patterns in an image of the plurality of images and matching a spatial dimension of the selected optical pattern to the characteristic dimension of the target optical pattern type. Matching the selected optical pattern to the target optical pattern type can include ascertaining a plurality of aspect ratios corresponding to the plurality of optical patterns or identifying a characteristic marking in an optical pattern of the plurality of optical patterns and matching the selected optical pattern to a target aspect ratio of the target optical pattern type or the characteristic marking.

Figure 5:
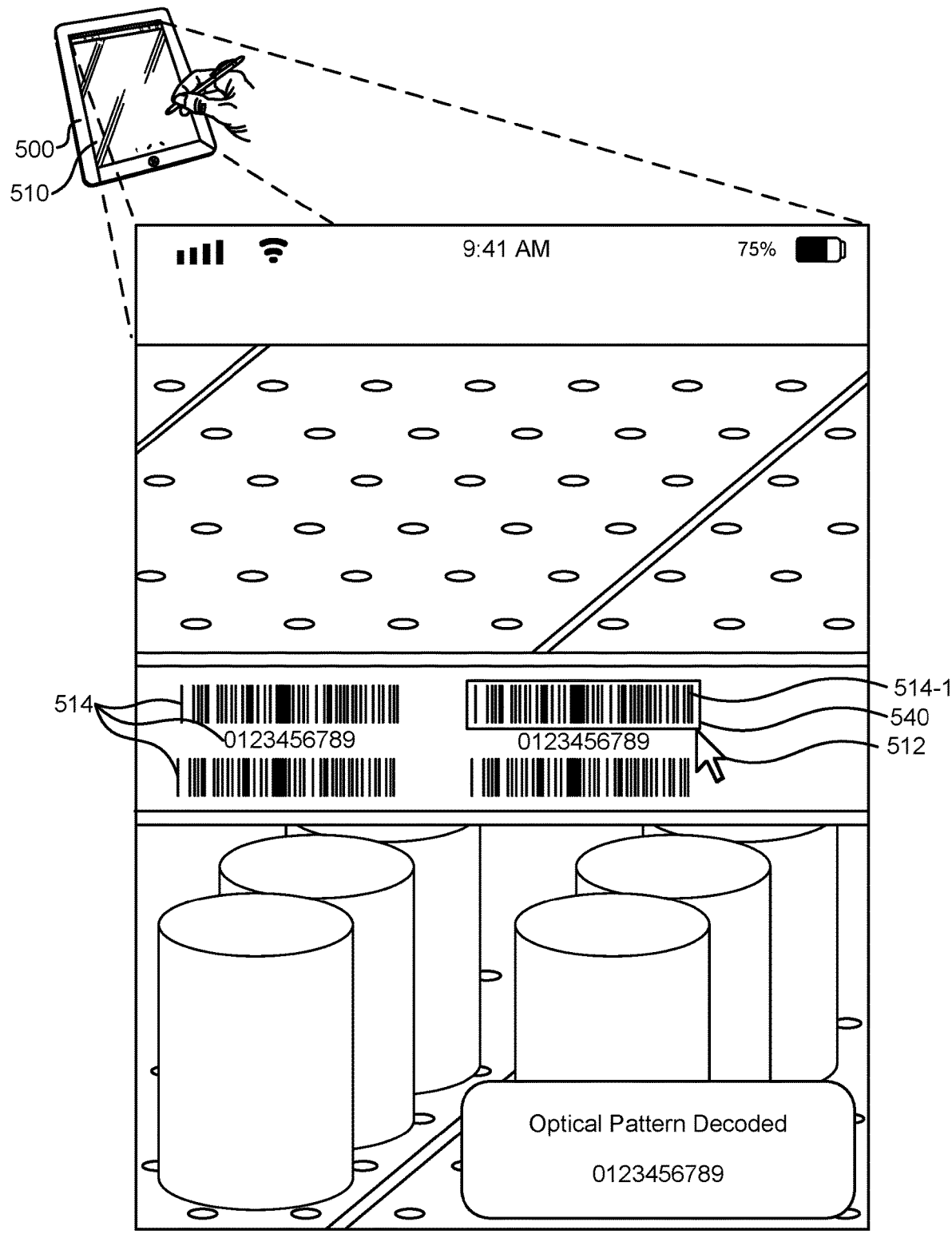
FIG. 5 depicts an example technique for automated recognition of a position of a pattern in an image containing multiple patterns and selection of the pattern, in accordance with some embodiments.

FIG. 5 depicts an example technique for automated recognition of a position of a pattern in an image containing multiple patterns and selection of the pattern, in accordance with some embodiments. In addition to graphical elements as described in reference to the foregoing figures, a display 510 of a mobile device 500 may include displaying a cursor 512 to indicate where on the display 510 a user action will select one or more optical patterns 514. For example, the cursor 512 may be a graphical element that functions as an indicator and/or a selector. In some embodiments, the cursor 512 is displayed at a position on the display 510 correlated to a location of a user action (e.g., a screen touch, a stylus action, etc.). Similarly, the cursor 512 may persist at the location of the last user action until a subsequent user action relocates the cursor 512 on the display 510. Additionally and/or alternatively, a second user action, such as another screen touch, may identify a first optical pattern 514-1, shown in FIG. 1 as a barcode, as a selected optical pattern. For example, when a first user action places the cursor 512 at a location of the display 510 corresponding to the first optical pattern 514-1, a second user action may indicate that the first optical pattern 514-1 is to be identified as the selected optical pattern. Accordingly the display 510 may present a graphical element 540 indicating the selected optical pattern. In FIG. 5, graphical element 540 is shown as a solid line overlay on the selected optical pattern. As described in more detail in reference to FIGS. 1-4, multiple graphical elements may be presented on the display 510 to indicate the positions and/or the recognition/decoding status of the optical patterns 514. For example, the graphical element 540 may change shape, color, size, or other visual characteristics, in response to changes in processing (e.g., the graphical element 540 may be an open bounding box before selection, a closed box after selection, and a filled box after decoding).

In some embodiments, the cursor 512 may be presented on the display 510 at a position corresponding to an optical pattern 514 automatically (e.g., without user selection of the position). In such cases, the display 510 may detect and/or recognize the optical patterns 514 and generate and/or present the cursor 512 on the display 510 at a first position corresponding to one of the optical patterns 514 (e.g., overlaid, adjacent, etc.). Instead of a user action to select the position of the cursor, a user action may cycle the cursor 512 between a number of predetermined positions on the display 510 corresponding to the optical patterns 514 detected and/or recognized in the scene. In some embodiments, the user action may include, but is not limited to, a screen tap, pressing a multi-function control (e.g., a volume button), and/or a tap on a housing of the display 510 (as described in more detail below).

In some embodiments, the mobile device 500 includes a sensor for detecting motion and/or acceleration (e.g., an accelerometer, gyroscope, inertial measurement unit, etc.). The sensor may be configured to, or sensor data can be processed to, detect, among other types of signals, an impulse resulting from a user tap on the exterior of the display 510. For example, the mobile device includes the display 510, a camera, one or more multi-function controls, and a motion and/or acceleration sensor. In this example, a user of the mobile device 500 may cycle the position of the cursor 512 through the optical patterns 514 present in the images that are detected and/or recognized by repeated pressing of the multi-function control, and may tap the exterior surface (e.g., a housing) of the display 510 to register a signal with the sensor to select the selected optical pattern. In another example, the user moves the mobile device 500 so that a reticle (e.g., the first graphical element 430-1 in FIG. 4) is over a desired code and the user taps the back of the mobile device 500 to select the code. A time of the tap is correlated to an image presented to the user at the time of the tap, and the code is selected.

While the operation of multi-function controls and motion and/or acceleration sensors are described in the context of the example embodiment illustrated in FIG. 5, embodiments described in reference to the other figures of this disclosure may incorporate similar features to facilitate identification and/or selection of optical patterns present in the scene. For example, in the context of FIG. 1, a user action may cycle through the constituent optical patterns in an optical pattern template, such that the selected optical pattern may be defined and or selected by a user of the display for subsequent automatic selection and/or decoding.

Figure 6:
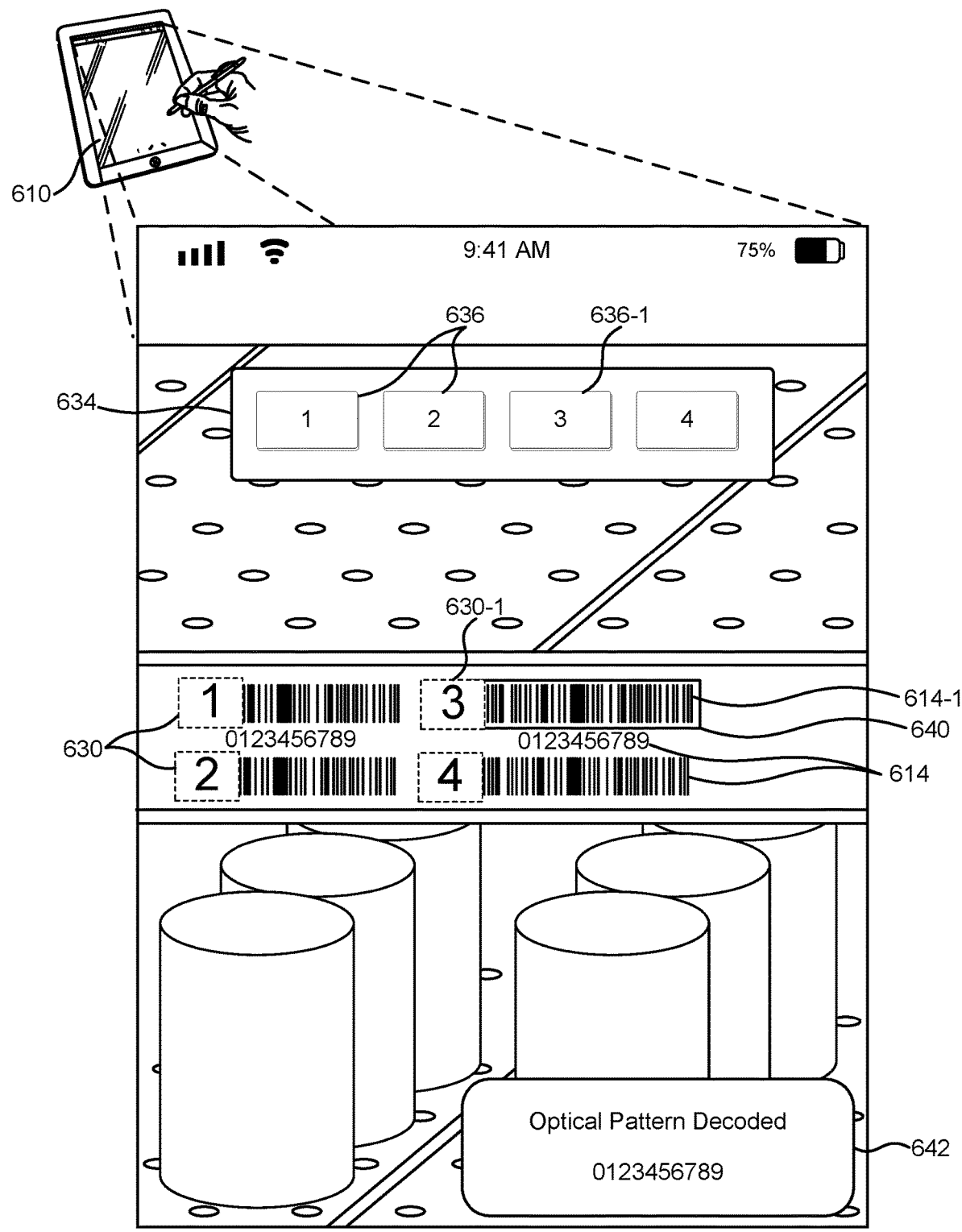
FIG. 6 depicts an example technique for automated recognition and selection of a pattern in an image containing multiple patterns using augment reality features, in accordance with some embodiments.

FIG. 6 depicts an example technique for automated recognition and selection of a pattern in an image containing multiple patterns using augment reality features, in accordance with some embodiments. In FIG. 6, a display 610 includes multiple graphical elements to facilitate processing of optical patterns 614 appearing in a real scene containing multiple optical patterns 614 and objects. In some embodiments, the graphical elements include one or more label elements 630 overlaid on an image presented on the display 610 that depicts the real scene at positions corresponding to the optical patterns 614 (e.g., overlaid and/or adjacent to optical patterns 614). In FIG. 6, a first optical pattern 614-1 is a barcode constructed of parallel lines.

The label elements 630 may include alphanumeric information (e.g., a numerical label, a letter, a symbol, etc.) to distinguish one recognized and/or detected optical pattern 614 from another optical pattern 614. For example, as shown in FIG. 6, the first optical pattern 614-1 is labeled with a first label element 630-1, shown as a numeral "3." The identification and/or selection of a selected optical pattern may be facilitated by an interactive graphical element 634 presenting an arrangement of graphical sub-elements 636 corresponding to the label elements 630 (e.g., a menu of interactive graphical sub-elements). In some embodiments, a user action may include a screen tap on a first graphical sub-element 636-1 (e.g., on sub-element "3") to indicate selection of the selected optical pattern associated with the first label element 630-1. Identification of the selected optical pattern may be accompanied by presentation of a graphical element 640 in the display 610. In FIG. 6, the graphical element 640 is shown as a solid line overlay on the selected optical pattern, but may be presented as a highlighted region, and/or a dynamic element, as described above.

As described in more detail in reference to FIG. 5, a multi-function control included in the display (e.g., a volume button) may be used to cycle through the label elements 630. In such cases, a particular label element may be emphasized, highlighted, or otherwise indicated by the display 610, such that the user action may indicate selection of the selected optical pattern corresponding to the particular label element.

Figure 7:
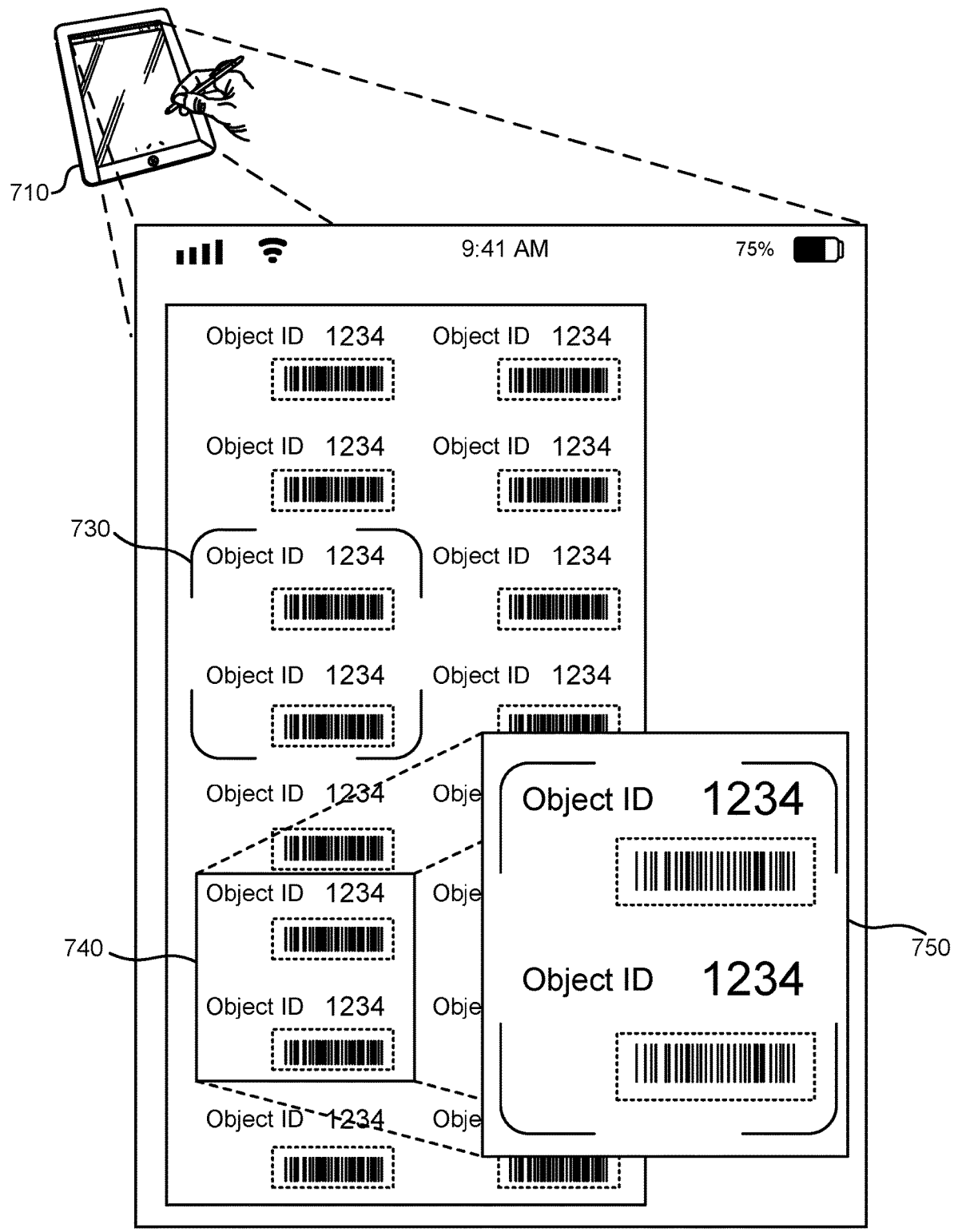
FIG. 7 depicts an example technique for automated recognition of a pattern in an image containing multiple patterns using magnification of a region of interest of the image, in accordance with some embodiments.

FIG. 7 depicts an example technique for automated recognition of a pattern in an image containing multiple patterns using magnification of a region of interest of the image, in accordance with some embodiments of the present disclosure. In some embodiments, a plurality of images depicting the an image presented in a display 710 includes multiple optical patterns at a size, shape, resolution, and/or aspect ratio that may not facilitate identification of a selected optical pattern. In such cases, one or more regions of the image may be magnified to facilitate detection, recognition, and/or decoding of the optical patterns.

In some embodiments, the display 710 includes a graphical element 730 (e.g., a bounding box or reticle as described in reference to FIG. 2, above) to indicate the region of the image wherein an optical pattern can be selected. The graphical element 730 may not be sufficiently large or sized appropriately to overlay an entire optical pattern. In some embodiments, an optical pattern is only selected when the graphical element 730 completely surrounds it, to reduce unintentional selection of optical patterns. A scene including multiple relatively small optical patterns may limit the effectiveness of direct selection of individual optical patterns using the graphical element 730, for example, when the graphical element 730 is large enough such that it overlies no fewer than two optical patterns at a time.

In some cases, a region 740 of the image may be magnified by a user action. For example, a screen tap or other user action as described in more detail in reference to FIGS. 1-6, above, may cause the display 710 to generate and/or present a magnified region 750 corresponding to an area of the display 710 within which the user action was located. In some embodiments, the magnified region 750 is presented as an overlay (e.g., a windowed view superimposed on the display 710). In some embodiments, the magnified region 750 is scaled and/or fitted to the display 710 to replace the image (e.g., as a freeze mode described in reference to FIG. 2). In such cases, the magnified region 750 may be presented until or after an optical pattern is selected, at which point the display 710 may revert to the image, and may indicate which optical pattern has been selected as described in more detail in reference to FIGS. 1-6.

In some embodiments, magnification may be implemented by a predefined magnification factor. For example, the magnification may be a preset incremental magnification (e.g., 2×, 3×, etc.), as opposed to a continuous magnification function (e.g., two-finger zoom of some mobile devices). In some embodiments, the magnification may be implemented in consecutive increments in response to successive user actions. For example, a first user action may implement a 2× magnification and a second user action may implement a 3× magnification.

Figure 8:
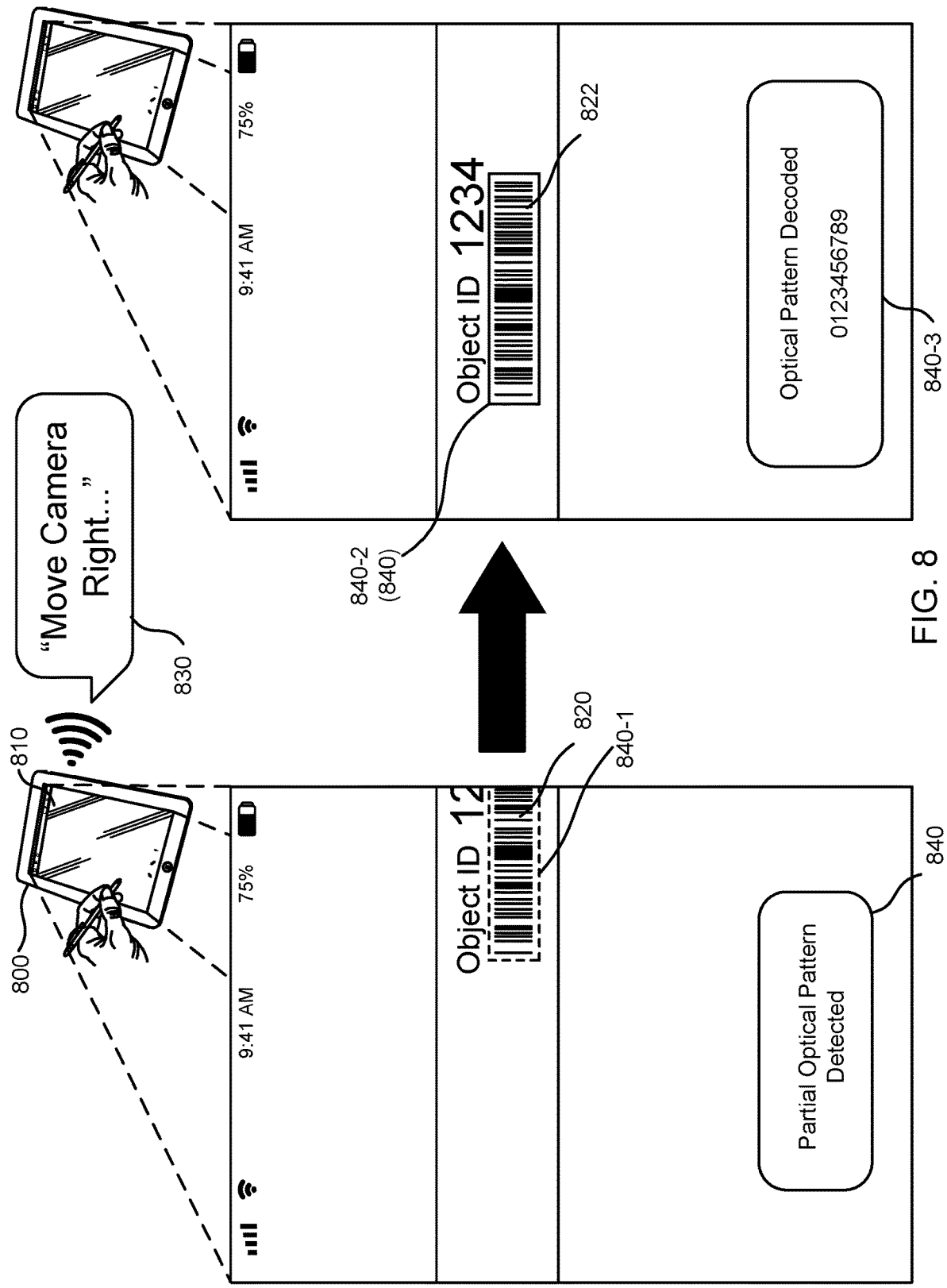
FIG. 8 depicts an example technique for automated recognition of a pattern in an image containing a partial optical pattern and for providing an audio prompt, in accordance with some embodiments.

FIG. 8 depicts an example device 800 for automated recognition of a pattern in an image containing a partial optical pattern and for providing an audio prompt, in accordance with some embodiments of the present disclosure. Hands-free operation and/or accessible design principles may be included in one or more embodiments of the present disclosure. As such, implementing audio-controls and recorded playback for user action and optical pattern selection may be provided in some embodiments.

In some embodiments, the plurality of images depicting a scene may include a partial optical pattern 820 or no complete optical patterns. To facilitate hands-free use, and/or for assistance to visually impaired users, a display 810 of a device 800 may provide an audio prompt 830 (e.g., audio feedback using a sound recording) to guide a user of the device 800 to translate and/or rotate a camera of the display 810 relative to the partial optical pattern 820. For example, if the partial optical pattern 820 is at a shallow angle such that the partial optical pattern 820 is skewed, the audio prompt 830 may suggest an adjustment of the viewing angle of the camera. As an example, when the optical pattern is on a curved label on an object (e.g., object 250 of FIG. 2), the audio prompt 830 could be to rotate the label in a particular direction (e.g., clockwise or counter-clockwise) or to center the FOV on the label to capture the entire optical pattern. Centering on the label can include determining whether the label is incomplete in the image, and what direction to move the camera to capture the complete label. For example, if the partial optical pattern 820 extends beyond the right edge of the display 810, as shown in FIG. 8, moving the camera to the right relative to the object will bring the entire optical pattern into view. The status of the partial optical pattern 820 may be indicated by a graphical element 840 that presents information that may include, but is not limited to, a direction to move the object bearing the partial optical pattern, the status of detection, recognition, and/or decoding of the partial optical pattern 820. For example, as shown in FIG. 8, the graphical element 840 is a rectangular graphical element with a text indication that a partial optical pattern has been detected in the image on the display 810.

In some embodiments, the audio prompt 830 may indicate that the optical pattern is partially hidden under an object or if the object could be turned to reveal the rest of the optical pattern. For example, if the scene includes an overlapping arrangement of files, each bearing an optical pattern, such that only partial optical patterns are visible (e.g., a filing cabinet with stacked files), the display 810 may provide the audio prompt 830 including an instruction to remove occluding objects. The instruction may be based in part on image recognition of the type of optical pattern (e.g., using a sample optical pattern) or it may be based on configuration of the device 800 for the specific application of the display 810.

Similarly, one or more audio prompts may be used to indicate that an optical pattern template (e.g., optical pattern template 120 of FIG. 1) is only partially detected in the image on the display 810. For example, a template identifier pattern (e.g., template identifier pattern 130 of FIG. 1) may be detected and/or decoded, but an optical pattern at a predetermined position in the template may be partially captured or out of frame (e.g., missing). In this way, the device 800 may determine that a partial or incomplete template is in the image, and may provide the audio prompt 830 to indicate to the user of the device 800 to reposition the device 800 to include the partial optical pattern 820, the missing optical pattern, and/or the entire optical pattern template.

After the camera has been adjusted such that it includes a complete optical pattern 840, for example, by capturing the entirety of the partial optical pattern 820, the display 810 may generate another audio prompt to indicate that the object has been detected, recognized, and/or decoded. Similarly, the display may present one or more graphical elements as described in more detail in reference to FIG. 2, to emphasize which optical pattern has been selected. In FIG. 8, a first graphical element 840, shown as a dashed line overlay surrounding the partial optical pattern 820, may indicate that the partial optical pattern 820 has been detected, but not selected or decoded. In some embodiments, the display further presents a graphical element overlaid on a region of the image including the optical pattern, including object identifier information. While FIG. 8 is described in reference to a single partial optical pattern 820, the techniques described herein may be similarly applied to facilitate hands-free or accessible design where the scene includes multiple partial optical patterns. For example, when an optical pattern template (e.g., optical pattern template 120 of FIG. 1) borne by an object is only partially captured, the display 810 may indicate that the camera should be translated, rotated, etc., to provide images of the entire optical pattern template.

The device 800 is described in reference to the partial optical pattern 820 appearing in a scene, however, could be similarly applied as part of the other example techniques described above. For example, in reference to the example technique in FIG. 7, above, hands free and/or accessible design principles could be implemented to facilitate selection of an optical pattern where multiple optical patterns in the image are too small or poorly-resolved (e.g., an audio prompt being "bring camera closer," or "magnify on selected pattern").

In some embodiments, identification of an optical pattern also can be accompanied by a recorded audio prompt (e.g., "optical pattern decoded"). The display 810 can present AR features to permit audio selection by calling out labels (e.g., label elements 630 of FIG. 6) overlaid on the optical patterns detected in the image without decoding all the optical patterns (e.g., a user of the display 810 may choose one by simply speaking the corresponding number into the microphone). Similarly, the display 810 may audibly list the available optical patterns based on decoding and/or recognizing the type of optical pattern (e.g., "the label includes a QR code and a code 39" or "the patterns detected describe a boarding pass for traveler A. Confirm selection?").

In some embodiments, a microphone may receive spoken feedback from a user of the display 810, for example when confirming a code selection in response to an audible prompt (e.g., Device: " . . . confirm selection" User: "Yes, confirmed"). As part of vocal confirmation, the display 810 may present the spoken feedback as text or images, for example, as an approach for confirming the spoken feedback before implementing the spoken feedback. In an example, the display 810 may present an image representing the action (e.g., a green check-mark to indicate a confirmation command). In some embodiments, a user of the display 810 may also provide additional metadata though voice and/or voice recognition. For example, in an inventory taking process, a user may scan a barcode on an item and then speak the number of items in stock into the microphone, rather than repeatedly scanning the barcode for each item in the inventory (e.g., when the barcode encodes a stock number for the item).

In some embodiments, the device 800 may implement audio prompts and/or may receive voice commands to facilitate hands-free selection and/or decoding of optical patterns. In the context of a logistics application, a delivery driver or other operator may interact with the device 800 through voice commands, while holding an object in one hand to highlight, scan and/or decode one or more optical patterns on a surface of the object. In an illustrative example, the delivery driver may be wearing gloves or may otherwise be unable to interact manually with the display 810. Additionally and/or alternatively, the device 800 may be configured to receive voice commands from the delivery driver, who may position a camera (e.g., an integrated camera of the device 800 or a separate camera in communication with the device 800) with one hand to capture images including the one or more optical patterns, while holding the object in another hand. While so doing, the driver may interact with the device 800 in one or more ways including, but not limited to selecting, scanning, and decoding optical patterns, freezing the display 810, and identifying an optical pattern type for automatic selection using voice commands and other vocal interactions. As such, the device 800 may also include language compatibility to receive voice commands in one or more languages corresponding to an account profile of a user of the device 800, a geographic or political region where the device 800 is located, etc.

In some embodiments, vocal interaction with the device 800 may permit additional and/or alternative functionality with respect to optical patterns, including, but not limited to, the announcement of certain attributes or information of the object or object identifier (e.g., via a speaker of the device 800). The announcement may occur instead of or in addition to a visual indication of the information on the display 810. For example, a user of the device 800 may learn from the audio prompt that an identifier was decoded that identifies a product with name A and that a second identifier was decoded that identifies a product with name B. The prompt may request the user to respond with the word A or B. In another embodiment, the user of the device 800 may enter an expiration date of a product through a voice command. For example, a store associate in a supermarket may be tasked to systematically record the date codes on a shelf. The associate may use one hand to hold an item and use the other hand to hold the scanning device. After scanning the object identifier on the product, the user may read the date code on the product aloud and the code may be stored in a database along with the object identifier.

In another example embodiment, a delivery worker may request the recipient of an object to speak their name into a microphone of the device 800 to confirm that the delivery was received. For example, the worker may first scan the object identifier on the delivery followed by the voice recording of the recipient saying their name. The voice recording may be transcribed into text (e.g., using a speech to text decoder). Furthermore, object identifier, and voice recording and/or transcription may be recorded in a database.

In another example embodiment, an audio prompt may be used to direct a user towards an object they are looking for. For example, the device may decode a plurality of object identifiers in a field of view. The device may then point out via an audio prompt which object identifier the user is looking for. Additionally, the device may explain the location of the object to the user by using a variety of possible methods. For example, in one embodiment, the audio prompt may be in reference to an X, Y, Z coordinate system; in another embodiment, the audio prompt may use landmarks, such as "the first shelf on the right"; in yet another embodiment the audio prompt may suggest a location relative to the user, for example "look up and to your left you see a mid-sized box."

In another embodiment the voice prompts may be provided to an operator of a machine, for example a forklift, or a crane, or any other type of machinery.

Figure 9:
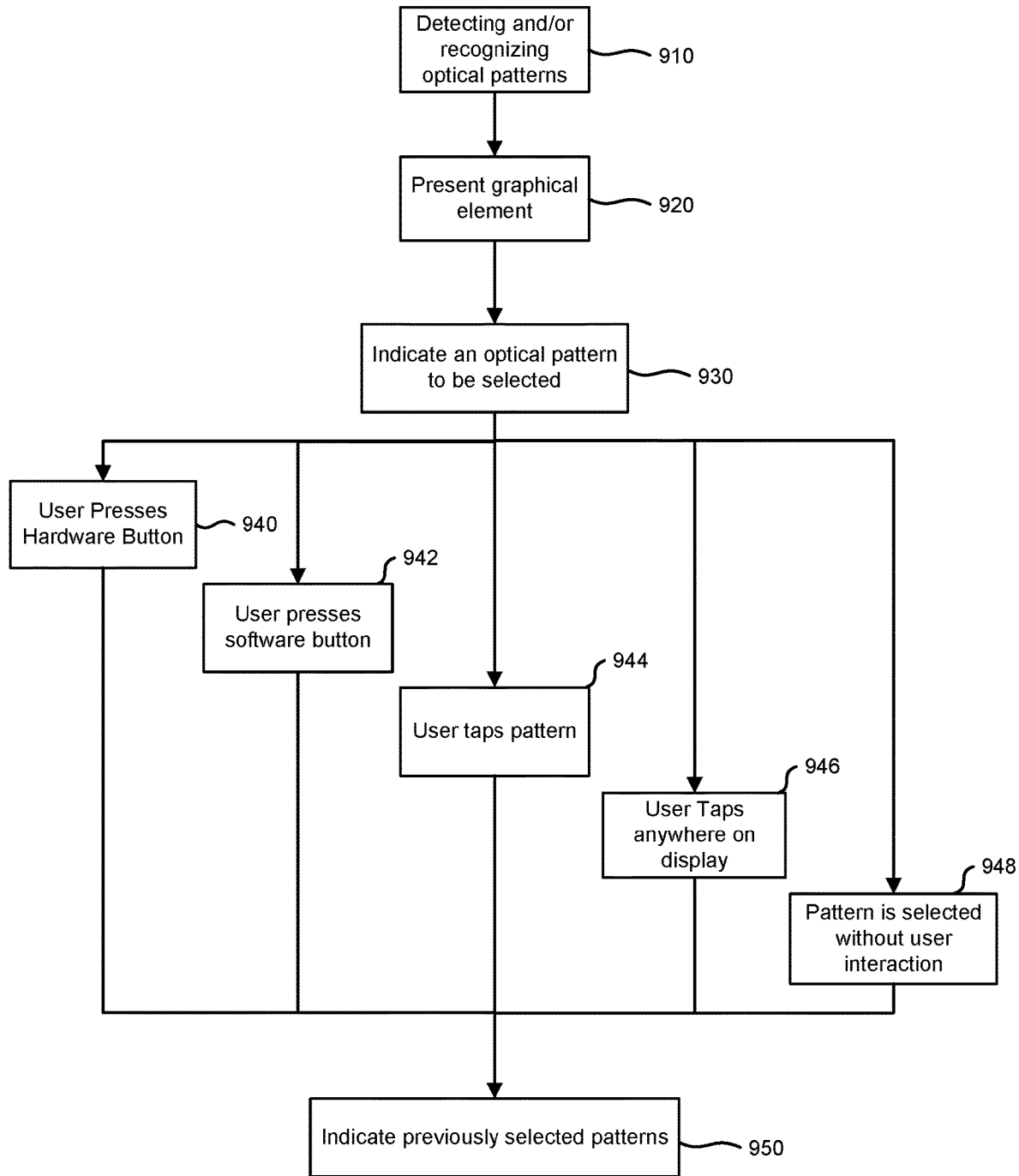
FIG. 9 depicts an example block flow diagram describing techniques for selecting a pattern in an image containing multiple patterns, in accordance with some embodiments.

FIG. 9 depicts an example block flow diagram describing techniques for selecting a pattern in an image containing multiple patterns, in accordance with some embodiments of the present disclosure. While shown as an arrangement of steps, the blocks represent processes that may be performed in additional and/or alternative sequences, and may be repeated, omitted, and/or replaced by similar and/or analogous processes to achieve similar results. The processes illustrated in FIG. 9 may be executed by a computing device (e.g., system 100 of FIG. 1), or an analogous system including a screen, a camera, and other constituent components configured to facilitate detection, recognition, selection, and/or decoding of optical patterns contained within an image depicting a real scene, as described above.

In some embodiments, an image includes multiple visible optical patterns (e.g., optical patterns 114 of FIG. 1). In such cases, a device may undertake process 910, whereby visible optical patterns are highlighted. As described in more detail in reference to FIGS. 1-2, above, this may include other forms of visualization to indicate, emphasize, and/or draw attention to the optical patterns in the image.

In addition to or in place of the highlighting of process 910, the process 920 includes presenting a graphical element overlaid on, or adjacent to, an optical pattern included in the image, for example, when the image contains multiple optical patterns. As described in more detail in reference to FIG. 2, the graphical element may include graphical elements including, but not limited to a reticle or a bounding box, or as described in more detail in reference to FIG. 5, the graphical element may include a cursor, to indicate which optical pattern will be selected in response to a user action.

In some embodiments, interactions between highlighting of process 910 and the graphical element of process 920 may be included to facilitate identification of a selected optical pattern. For example, process 930 may include modifying the highlighting of process 910 to indicate which of the optical patterns included in the FOV will be selected. Additionally and/or alternatively, the color of the highlighting may indicate the status of the optical pattern (e.g., detected, recognized, selected, decoded, etc.). For example, when a reticle overlays an optical pattern on the display, a highlighted region overlaid on the optical pattern may change color (e.g., from white to green). In some embodiments, process 930 may also include modifying the graphical element of process 920 to facilitate selection of an optical pattern. For example, a bounding box may adjust to the size and shape of an optical pattern in an image, to emphasize the optical pattern before selection.

Processes 940-948 describe different techniques for user actions, as described in more detail in reference to FIGS. 1-8. These are not intended to be a limiting set of possible techniques, but rather exemplary processes that are included in a broader set of potential techniques compatible with an interactive display presenting a plurality of images including one or more optical patterns. For example, process 940 includes receiving a user action via a hardware button, such as one or more multi-function controls in communication with the display (e.g., volume buttons), as described in more detail in reference to FIG. 5. Process 942 includes receiving a user action via a software button, such as an interactive graphical element presented on the display, as described in more detail in reference to FIG. 2 (e.g., second graphical element 230-2 of FIG. 2) and FIG. 6. (e.g., interactive graphical element 634 of FIG. 6). Process 944 and process 946 both describe techniques for a user action directly on the device. As described in more detail in reference to FIG. 2, a user action may include a user tap directly on the display at a position of an optical pattern and/or anywhere on the display. In such cases, as when the user action is a tap on a highlighted barcode, the display may omit the graphical element of process 920. Process 948 includes selecting an optical pattern without direct user action, as described in more detail in reference to FIG. 4. For example, an optical pattern underlying and/or adjacent to a graphical element (e.g., first graphical element 430-1 of FIG. 4) may trigger a selection of the optical pattern after a predefined period of time (or equivalent number of frames) has elapsed.

In some embodiments, multiple optical patterns are selected using the processes described above. In such cases, the display may generate and/or present graphical elements indicative of those optical patterns that have been previously selected, to differentiate between unselected optical patterns, previously selected optical patterns, and a presently selected optical pattern. For example, in response to the user action to indicate a selection of a second optical pattern under and/or adjacent to the graphical element of process 920, after a first optical pattern has already been selected, process 950 may include generating and/or presenting on the display one or more graphical elements to indicate, emphasize, or otherwise present previously selected optical patterns. For example, the graphical elements described by process 950 may include highlighting in a different color from that of process 910 (e.g., white highlighting as opposed to yellow highlighting). Additionally and/or alternatively, the graphical elements may include additional features to indicate information about the previously selected patterns (e.g., color, dynamic features, or alphanumeric labels). For example, the graphical elements may include a closed boundary line around the highlighting (e.g., a green outline) to indicate that the optical pattern has been previously selected and/or decoded. As another example, previously selected patterns may be indicated by an icon (e.g., a check-mark icon) overlaid on the optical pattern on the display.

Figure 10:
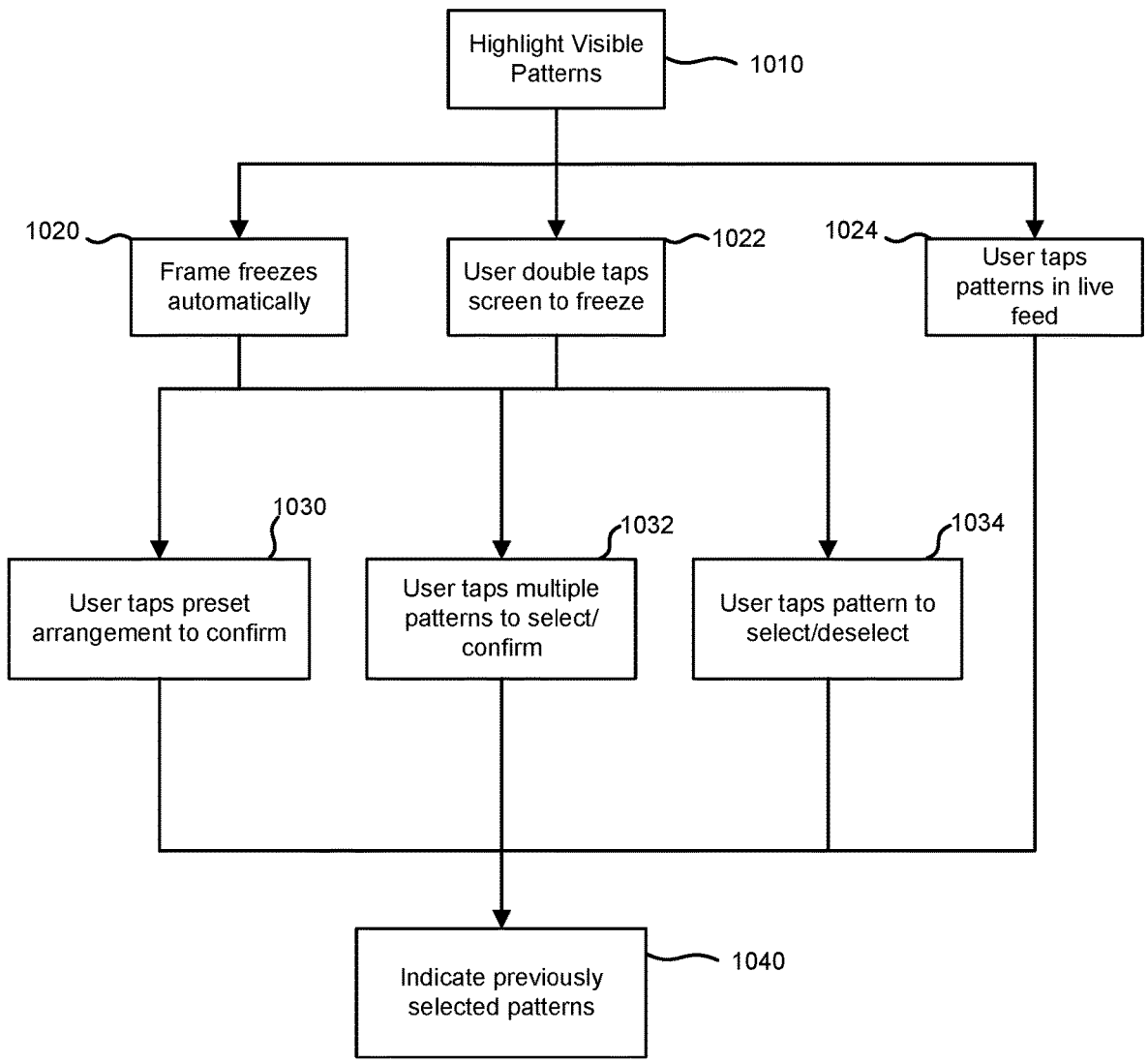
FIG. 10 depicts an example block flow diagram describing techniques for freezing a scene at an image containing multiple patterns for selecting one or more patterns, in accordance with some embodiments.

FIG. 10 depicts an example block flow diagram describing techniques for freezing a scene on an image containing multiple patterns for selecting one or more patterns, in accordance with some embodiments. As described in more detail in reference to FIG. 2, selection of an optical pattern in an image depicting a real scene may be facilitated by freezing on an image, switching from a "live" or "real time" mode to a "paused" or "frozen" mode.

As described in reference to FIG. 9, above, a display may generate and/or present one or more graphical elements to facilitate processing optical patterns contained in the image. For example, process 1010 includes presenting highlighted regions overlying visible optical patterns. The highlighting may include a simple element having a pre-defined opacity fraction. The graphical elements may be dynamic, as described in reference to the AR features, above.

Process 1020 and process 1022 describe techniques for changing the display from live to paused view (e.g., screen freezing) according to various embodiments. In some embodiments, process 1020 includes freezing the image automatically, as described in reference to FIG. 2, which may be implemented by the display in response to various parameters including, but not limited to, detecting, recognizing, and/or decoding a predefined number of optical patterns in the image, a measure of change in the number of optical patterns in the image, or other features determined by one or more characteristics of the display. Process 1022 includes a user action used to trigger the freeze (e.g., a double-tap on the screen of the display). A similar user action may unfreeze the screen, or a different user action may be used (e.g., a press-and-hold on the screen). Process 1024 describes selection directly in the live mode by a user action, e.g., as described in reference to FIG. 2 and FIGS. 4-7.

In some embodiments, processes 1030-1034 describe the various techniques by which a user action may be used to select an optical pattern contained in the image. These are not intended to be a limiting set of possible techniques, but rather exemplary processes that are included in a broader set of potential techniques compatible with an interactive display presenting a plurality of images including one or more optical patterns. In process 1030, a user interaction is used to confirm a selection. This may include a user tap on the display over a preset arrangement of optical patterns in the image to confirm the selection. In some embodiments, process 1030 includes a user action involving a screen pause to facilitate confirmation of an optical pattern template, as described in more detail in reference to FIG. 1. For example, in a conveyor belt system, a display may automatically freeze to permit a user to manually confirm that an optical pattern template included in the image is to be decoded. Similarly, when a user wishes to review an optical pattern template more closely, a first user action may freeze the image and a second user action may confirm the optical pattern template is to be decoded.

Processes 1032-1034, similarly to process 1030, includes facilitating selection of one or more patterns included in the image by a user action to select optical patterns multiply and/or individually, as described in more detail in reference to FIG. 2. With the screen frozen on the display, the user action (e.g., a user screen touch) may select and/or confirm selection of a selected optical pattern. In some embodiments, the display may be configured to process a single optical pattern within the image, but may also be configured to process multiple optical patterns.

Process 1040 may include the display generating and/or presenting additional graphical elements to indicate which of the optical patterns visible in the image have been detected, recognized, selected, and/or decoded. For example, previously selected optical patterns may be highlighted in white with a green outline. Additional and/or alternative graphical element configurations (as described in more detail in reference to FIGS. 1-8) are described above.

Figure 11:
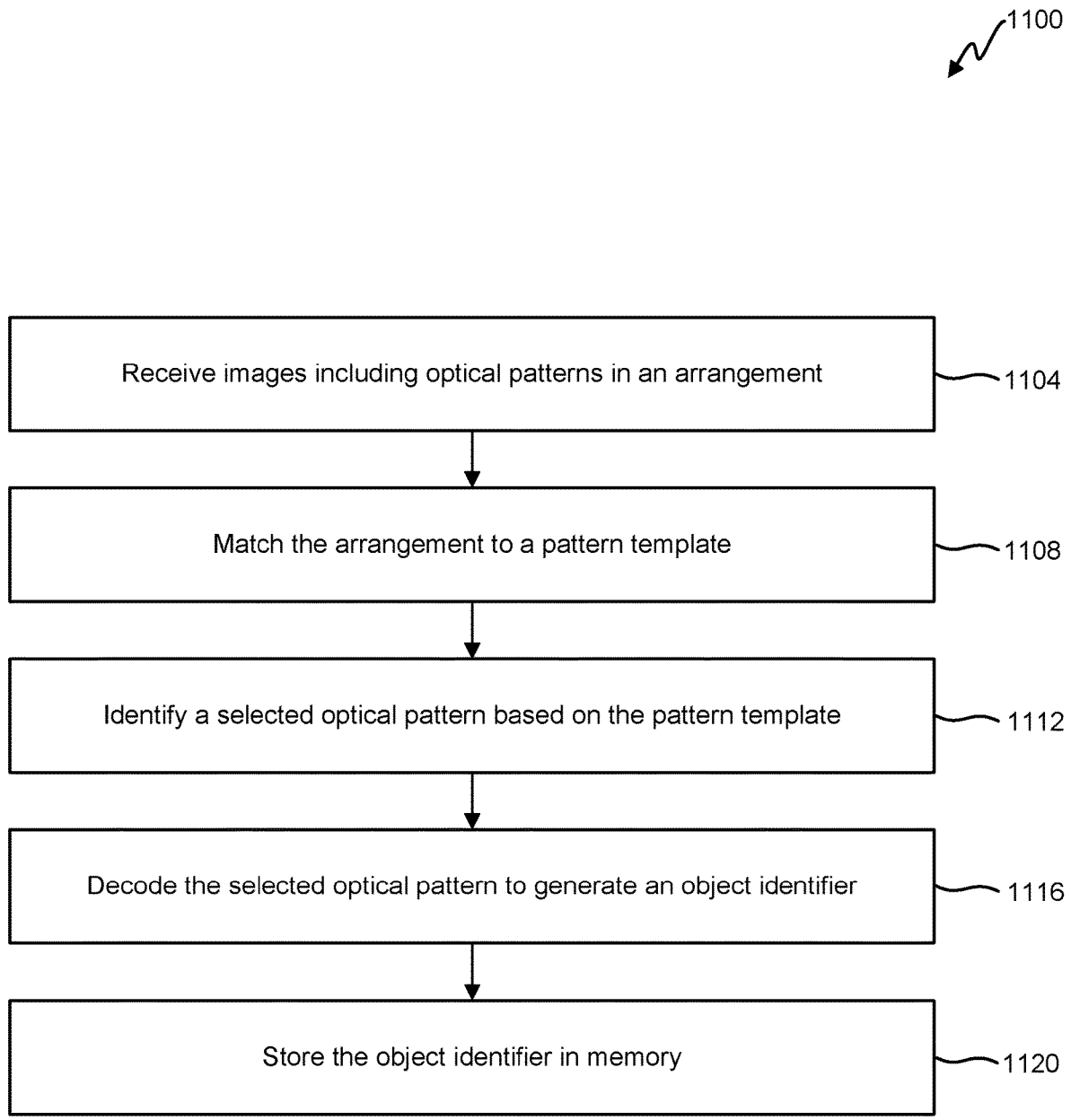
FIG. 11 illustrates a flowchart of an embodiment of a process for automated recognition of a pattern in an image containing an arrangement of multiple patterns, in accordance with some embodiments.

FIG. 11 illustrates a flowchart of an embodiment of a process 1100 for automated recognition of a pattern in an image containing an arrangement of multiple patterns. Process 1100 begins in step 1104 with receiving images including optical patterns in an arrangement. A computer device (e.g., system 100 of FIG. 1) may receive the images from a camera (e.g., a camera integrated with the system 100. The images may depict a real scene in a field of view (FOV) of the camera, such that the images contain multiple optical patterns, as well as real world objects, faces, or other features other than the optical patterns. The optical patterns may be arranged according to a standard and/or predefined arrangement (e.g., as in a template, label, etc.).

Process 1100 continues in step 1108, whereby the arrangement is matched to a pattern template. As described in more detail in reference to FIG. 1, matching the optical patterns visible in the image to the pattern template enables decoding only a subset of optical patterns (e.g., decoding only one optical pattern when only one optical pattern is of interest in a pattern template), which may reduce computation resources used to process the images received in step 1104. Pattern templates may include standard arrangements of optical codes (e.g., VDA labels, shipping labels, and passport photo pages).

Once matched to a pattern template, step 1112 includes identifying, from the arrangement of optical patterns in the image, a selected optical pattern (e.g., selected optical pattern 114-2 of FIG. 1) based on the predefined position of the selected optical pattern in the pattern template. For example, if the pattern template corresponds to a logistical label (e.g., a VDA label) the selected optical pattern may be identified to collect and/or confirm supply chain data as part of logistical operations.

In step 1116, the selected optical pattern is decoded to generate an object identifier. As described in more detail above, the object identifier includes, but is not limited to, various types of characteristic information describing the person, object, place, etc. corresponding to the selected optical pattern. For example, in a barcode attached to a product label, the object identifier may describe a stock keeping unit (SKU) or other logistical indicator correlated to an inventory management system (e.g., an electronic database of object identifiers). As described in reference to FIG. 1, decoding the optical pattern may be accompanied by generating and/or presenting one or more graphical elements including an indication of decoding success and the object identifier on the display.

Process step 1120, using the object identifier determined in step 1116, includes storing the object identifier in memory of the display and/or in an external memory device. Storing the object identifier permits access to decoded optical pattern information to subsequent processes (e.g., logistical tracking operations, identity verification and/or authorization, access control, etc.).

Figure 12:
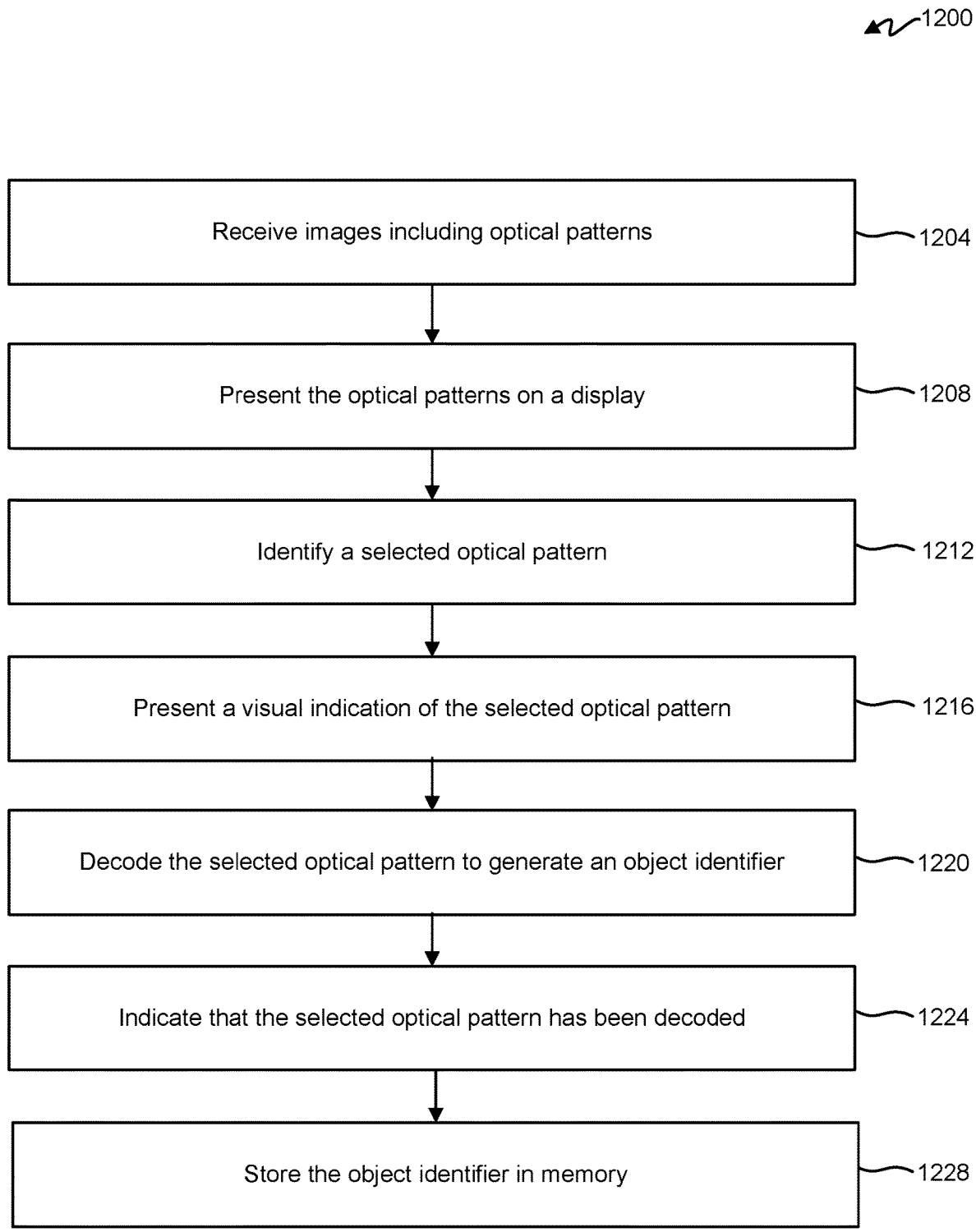
FIG. 12 illustrates a flowchart of an embodiment of a process for automated recognition and selection of a pattern in an image containing multiple patterns, in accordance with an embodiment of the present disclosure.

FIG. 12 illustrates a flowchart of an embodiment of a process 1200 for automated recognition and selection of a pattern in an image containing multiple patterns. Process 1200 begins in step 1204 with receiving images including optical patterns. As described in more detail in reference to FIG. 11, the images may be captured using a camera included in the computer system. As such, the images may depict a real scene containing multiple optical patterns as well as real objects, people, etc.

In step 1208, the process includes presenting the optical patterns on a display (e.g., display 210 of FIG. 2). The display may be part of a mobile device (e.g., a tablet, smartphone, or other portable electronic device), or may be another form of electronic computer system including a screen and being configured to receive user actions. The optical patterns may be presented on the display as a "live feed" of images or as a "paused" view, as described in more detail in reference to FIG. 3. The optical patterns may be indicated by graphical elements to facilitate processing the optical patterns. These may include highlighted regions, bounding boxes, alphanumeric indicators, etc.

In step 1212, the process includes identifying a selected optical pattern. Identification may be automatic, e.g., as described in reference to FIG. 2 and FIG. 4, or manual, resulting from a user action, such as a screen tap or via a multi-function control in communication with the display. As described in more detail in reference to FIG. 6 and FIG. 7, identifying the selected optical pattern may include selecting a graphical element presented on the screen (e.g., interactive graphical element 634 of FIG. 6) or by generating and/or presenting a magnified region of the display to better distinguish small or poorly resolved optical patterns in the images.

In step 1216, a visual indication of the selected optical pattern is presented on the display. As described in more detail in reference to FIG. 2, the selected optical pattern (e.g., selected optical pattern 214-1 of FIG. 2) may be indicated by an additional and/or alternative graphical element to distinguish the selected optical pattern from other optical patterns included in the images received in step 1204. For example, the visual indication may include a graphical element with a different size, shape, color, dynamic properties, etc. As an example, as described in reference to FIG. 4, a graphical element (e.g., bounding box 430 of FIG. 4) may change shape, color, and/or size, in response to selection of an optical pattern.

In step 1220, the process includes decoding the selected optical pattern to generate an object identifier. As in process 1100 of FIG. 11, decoding the selected optical pattern includes processing the region of one or more images corresponding to the selected optical pattern to interpret and decode the information represented as an optical pattern. For example, the selected optical pattern may be a barcode constructed of parallel bars, encoding numerical information identifying an object. As another example, the optical pattern may be a two-dimensional pattern code, such as a QR code or an Aztec code, containing identity information about a passenger on an airline flight (e.g., as included on a boarding pass). In some embodiments, the optical pattern is an alphanumerical code.

In step 1224, the process 1200 includes indicating that the selected optical pattern has been decoded. Step 1224 may include generating and/or presenting on the display one or more visual indications to demonstrate that the selected optical pattern has been decoded. As described in more detail in reference to FIGS. 2-8, these may include graphical elements presented overlaid and/or adjacent to the selected optical pattern, as well as elsewhere on the display or as audio prompts. In some embodiments, the graphical elements include the object identifier as alphanumeric text (e.g., graphical element 240-1 of FIG. 2). In some embodiments, the graphical elements include visual indicators to show the location of the selected optical pattern and to indicate it has been decoded (e.g., graphical element 240-1 of FIG. 2).

In step 1228, the process 1200 includes storing the object identifier in memory. As described in more detail in reference to FIG. 11, storing the object identifier may include communicating the object identifier data to a memory device included in the display (e.g., a memory device of a mobile electronic device) and/or to an external memory device (e.g., a remote data store via a network connection). The object identifier, thus stored, is available for subsequent applications.

Figure 13:
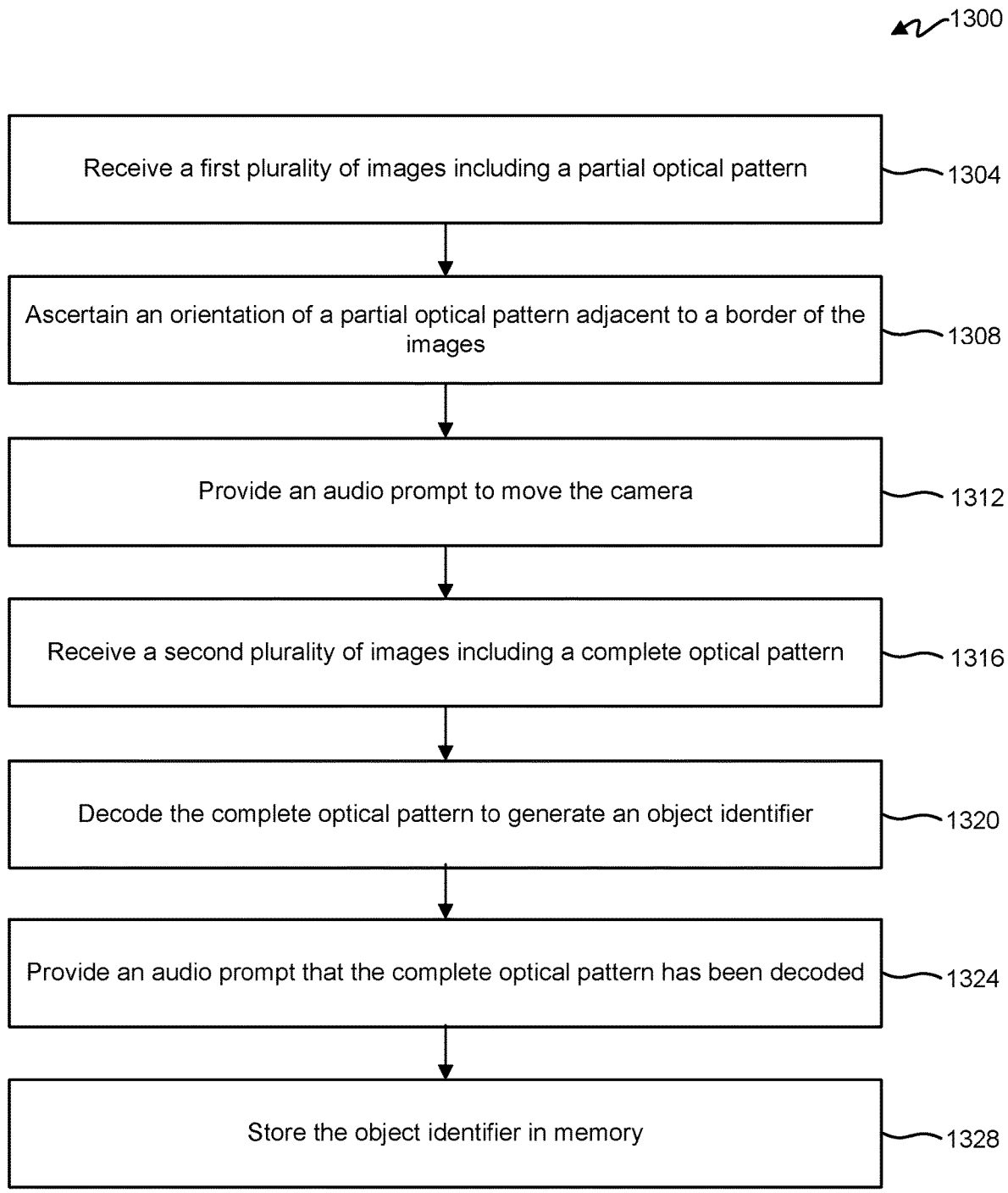
FIG. 13 illustrates a flowchart of an embodiment of a process for automated recognition of a pattern in an image containing a partial optical pattern and providing an audio prompt, in accordance with an embodiment.

FIG. 13 illustrates a flowchart of an embodiment of a process 1300 for automated recognition of a pattern in an image containing a partial optical pattern and providing an audio prompt, in accordance with an embodiment of the present disclosure. Process 1300 begins in step 1304 with receiving images including a partial optical pattern (e.g., partial optical pattern 820 of FIG. 8). In some embodiments, the images may include multiple optical patterns, of which one or more are partial optical patterns. As such, the steps of process 1300 may be repeated for multiple optical patterns, based in part on whether an optical pattern overlaid by a graphical element used to identify a selected optical pattern is also only partially included in the images received.

In step 1308, the process 1300 includes ascertaining an orientation of a partial optical pattern adjacent to a border of the images. As described in more detail in reference to FIG. 8, the partial optical pattern may be partially occluded by a border of the images (e.g., the partial optical pattern may be cut off by the border). Ascertaining the orientation of the partial optical pattern may include ascertaining a start indicator and/or an end indicator of the optical pattern, from which a direction of motion of the camera may be determined. Additionally and/or alternatively, the orientation of the partial optical pattern may be ascertained in relation to the border of the image, in part by finding whether the partial optical pattern is adjacent to the border and whether the optical pattern is recognized and/or detected as a complete optical pattern.

In step 1312, the process 1300 includes providing an audio prompt (e.g., audio prompt 830) to move the camera to cover the entire optical pattern. As described in more detail in reference to FIG. 8, the audio prompt may include a prerecorded message or audio playback from a speaker or other audio output device in communication with the display. For example, in a mobile electronic device, the audio prompt may be communicated to portable speakers (e.g., earphones) or played by speakers included in the mobile electronic device.

In step 1316, the process 1300 includes receiving images including a complete optical pattern. In some embodiments, step 1316 includes moving the camera according to the audio prompt (e.g., "move the camera right") while collecting images in live mode, as described in reference to FIG. 2, until the partial optical pattern is completely contained within the images received.

In step 1320, the process 1300 includes decoding the complete optical pattern to generate an object identifier. As described in more detail in reference to FIGS. 11-12, decoding the complete optical pattern may be accompanied by dynamic graphical elements and/or visual indication, facilitating processing of optical patterns by incorporating hands-free or accessible design principles. Decoding may proceed by one or more techniques for interpreting optical patterns, based, for example, at least in part on image analysis of the complete optical pattern as captured in the images.

In step 1324, the process 1300 includes providing an audio prompt that the complete optical pattern has been decoded. As with the visual indication described in reference to FIGS. 11-12, the audio prompt may provide a confirmation that the complete optical pattern has been decoded, and may also include the object identifier for auditory confirmation that the complete optical pattern corresponds to the optical pattern intended for decoding.

In step 1328, the process 1300 includes storing the object identifier in memory. As described in more detail in reference to FIGS. 11-12, storing the object identifier in memory permits the application of the object identifier data for additional processes including, but not limited to logistical management, identity verification, and/or access control.

Figure 14:
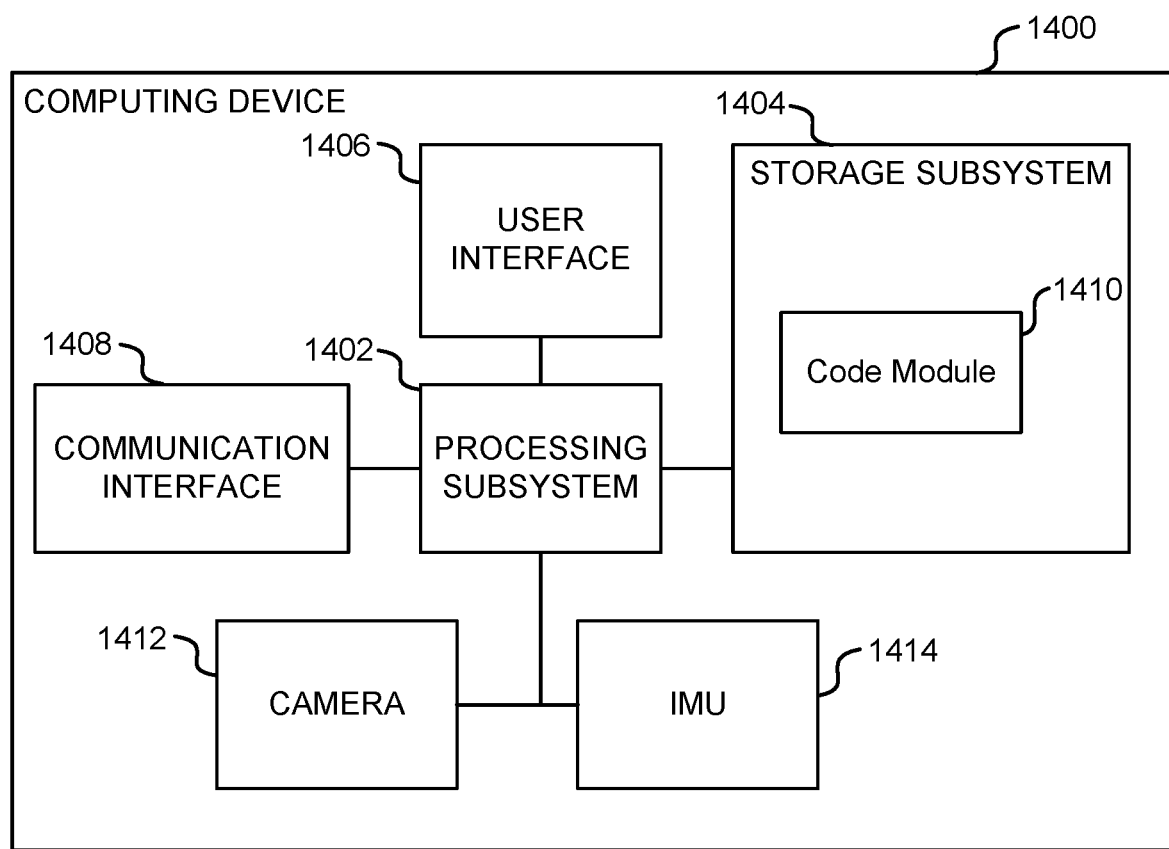
FIG. 14 depicts a block diagram of an embodiment of a computer system.

FIG. 14 is a simplified block diagram of a computing device 1400. Computing device 1400 can implement some or all functions, behaviors, and/or capabilities described above that would use electronic storage or processing, as well as other functions, behaviors, or capabilities not expressly described. Computing device 1400 includes a processing subsystem 1402, a storage subsystem 1404, a user interface 1406, and/or a communication interface 1408. Computing device 1400 can also include other components (not explicitly shown) such as a battery, power controllers, and other components operable to provide various enhanced capabilities. In various embodiments, computing device 1400 can be implemented in a desktop or laptop computer, mobile device (e.g., tablet computer, smart phone, mobile phone), wearable device, media device, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of functions described above.

Storage subsystem 1404 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include random access memory (RAM), including dynamic RAM (DRAM), static RAM (SRAM), or battery backed up RAM. In some embodiments, storage subsystem 1404 can store one or more applications and/or operating system programs to be executed by processing subsystem 1402, including programs to implement some or all operations described above that would be performed using a computer. For example, storage subsystem 1404 can store one or more code modules 1410 for implementing one or more method steps described above.

A firmware and/or software implementation may be implemented with modules (e.g., procedures, functions, and so on). A machine-readable medium tangibly embodying instructions may be used in implementing methodologies described herein. Code modules 1410 (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module 1410) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc.

Implementation of the techniques, blocks, steps and means described above may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module 1410 may comprise sets of instructions (codes) embodied on a computer-readable medium that directs a processor of a computing device 1400 to perform corresponding actions. The instructions may be configured to run in sequential order, in parallel (such as under different processing threads), or in a combination thereof. After loading a code module 1410 on a general purpose computer system, the general purpose computer is transformed into a special purpose computer system.

Computer programs incorporating various features described herein (e.g., in one or more code modules 1410) may be encoded and stored on various computer readable storage media. Computer readable media encoded with the program code may be packaged with a compatible electronic device, or the program code may be provided separately from electronic devices (e.g., via Internet download or as a separately packaged computer-readable storage medium). Storage subsystem 1404 can also store information useful for establishing network connections using the communication interface 1408.

User interface 1406 can include input devices (e.g., touch pad, touch screen, scroll wheel, click wheel, dial, button, switch, keypad, microphone, etc.), as well as output devices (e.g., video screen, indicator lights, speakers, headphone jacks, virtual- or augmented-reality display, etc.), together with supporting electronics (e.g., digital-to-analog or analog-to-digital converters, signal processors, etc.). A user can operate input devices of user interface 1406 to invoke the functionality of computing device 1400 and can view and/or hear output from computing device 1400 via output devices of user interface 1406. For some embodiments, the user interface 1406 might not be present (e.g., for a process using an ASIC).

Processing subsystem 1402 can be implemented as one or more processors (e.g., integrated circuits, one or more single-core or multi-core microprocessors, microcontrollers, central processing unit, graphics processing unit, etc.). In operation, processing subsystem 1402 can control the operation of computing device 1400. In some embodiments, processing subsystem 1402 can execute a variety of programs in response to program code and can maintain multiple concurrently executing programs or processes. At a given time, some or all of a program code to be executed can reside in processing subsystem 1402 and/or in storage media, such as storage subsystem 1404. Through programming, processing subsystem 1402 can provide various functionality for computing device 1400. Processing subsystem 1402 can also execute other programs to control other functions of computing device 1400, including programs that may be stored in storage subsystem 1404.

Communication interface 1408 can provide voice and/or data communication capability for computing device 1400. In some embodiments, communication interface 1408 can include radio frequency (RF) transceiver components for accessing wireless data networks (e.g., Wi-Fi network; 3G, 4G/LTE; etc.), mobile communication technologies, components for short-range wireless communication (e.g., using Bluetooth communication standards, NFC, etc.), other components, or combinations of technologies. In some embodiments, communication interface 1408 can provide wired connectivity (e.g., universal serial bus, Ethernet, universal asynchronous receiver/transmitter, etc.) in addition to, or in lieu of, a wireless interface. Communication interface 1408 can be implemented using a combination of hardware (e.g., driver circuits, antennas, modulators/demodulators, encoders/decoders, and other analog and/or digital signal processing circuits) and software components. In some embodiments, communication interface 1408 can support multiple communication channels concurrently. In some embodiments the communication interface 1408 is not used.

Camera 1412 can generate images of a real world scene including one or more optical patterns, as described in more detail in reference to FIGS. 1-13. The camera may be an integrated electronic camera forming a component of a mobile electronic device (e.g., a tablet or a smartphone). As such, the camera may be described by a framerate, an aspect ratio, and a field of view (FOV), as described in reference to the figures, above. The camera 1412 may function according to one or more configurable settings including, but not limited to, exposure settings, focus routines, and/or framerate. For example, the camera 1412 may implement an autofocus routine that cycles across a range of focal positions, and selects a focal position corresponding to the best focus for an optical pattern detected by the camera.

IMU 1414 can measure motion and/or acceleration of the computing device 1400. In some embodiments, the IMU 1414 can include a gyroscope, an accelerometer, or other measurement device (e.g., a MEMS device) configured to measure tactile input provided to a housing of the computing device, as described in more detail in reference to FIG. 2. The tactile input may be recorded as an impulse (e.g., a short-duration discontinuity in acceleration as a function of time).

It will be appreciated that computing device 1400 is illustrative and that variations and modifications are possible. A computing device can have various functionality not specifically described (e.g., voice communication via cellular telephone networks) and can include components appropriate to such functionality.

Further, while the computing device 1400 is described with reference to particular blocks, it is to be understood that these blocks are defined for convenience of description and are not intended to imply a particular physical arrangement of component parts. For example, the processing subsystem 1402, the storage subsystem, the user interface 1406, and/or the communication interface 1408 can be in one device or distributed among multiple devices.

Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Electronic devices described herein can be implemented using computing device 1400.

Various features described herein, e.g., methods, apparatus, computer-readable media and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

While the principles of the disclosure have been described above in connection with specific apparatus and methods, it is to be understood that this description is made only by way of example and not as limitation on the scope of the disclosure. Embodiments were chosen and described in order to explain the principles of the invention and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

ILLUSTRATIVE ASPECTS

As used below, any reference to a series of aspects (e.g., "Aspects 1-4") or non-enumerated group of aspects (e.g., "any previous or subsequent aspect") is to be understood as a reference to each of those aspects disjunctively (e.g., "Aspects 1-4" is to be understood as "Aspects 1, 2, 3, or 4").

Aspect 1 is a method of image analysis for recognition of a pattern in an image containing multiple patterns, the method comprising: receiving a plurality of images acquired by a camera, the plurality of images comprising a plurality of optical patterns; presenting the plurality of optical patterns on a display; identifying a selected optical pattern of the plurality of optical patterns based on: a user action, and a position of the selected optical pattern in one or more of the plurality of images; presenting on the display a visual indication of the selected optical pattern; decoding the selected optical pattern to generate an object identifier; indicating, via the visual indication, that the selected optical pattern has been decoded; and storing the object identifier in a memory device.

Aspect 2 is the method of any previous or subsequent aspect, wherein the plurality of optical patterns are barcodes, constructed of parallel bars.

Aspect 3 is the method of any previous or subsequent aspect, wherein: the plurality of optical patterns comprise a first optical pattern and a second optical pattern; the first optical pattern is the selected optical pattern; and the second optical pattern is not decoded.

Aspect 4 is the method of any previous or subsequent aspect, wherein the user action comprises a screen touch on the display.

Aspect 5 is the method of any previous or subsequent aspect, wherein the user action comprises a screen touch on a region of the display corresponding to an optical pattern of the plurality of optical patterns.

Aspect 6 is the method of any previous or subsequent aspect, further comprising: receiving a user interaction with a region of the display; and magnifying an area of the plurality of images corresponding to the region by a predefined magnification factor.

Aspect 7 is the method of any previous or subsequent aspect, further comprising presenting one or more graphical elements overlaid on the plurality of images.

Aspect 8 is the method of any previous or subsequent aspect, wherein the one or more graphical elements comprise at least one of a reticle, a bounding box, or a highlighted region, wherein at least the highlighted region is presented as an overlay on an optical pattern of the plurality of optical patterns.

Aspect 9 is the method of any previous or subsequent aspect, wherein: the user action comprises a screen touch on a second graphical element configured to trigger a selection of an optical pattern of the plurality of optical patterns; and the selected optical pattern is an optical pattern of the plurality of optical patterns overlaid by the highlighted region.

Aspect 10 is the method of any previous or subsequent aspect, wherein: the user action is a first user action; the screen touch is a first screen touch; and the method further comprising: receiving an input indicating a second user action; the second user action is a second screen touch on the second graphical element, after the first screen touch on the second graphical element; selecting a second selected optical pattern of the plurality of optical patterns overlaid by a second highlighted region presented as a second overlay on a second optical pattern of the plurality of optical patterns; decoding the second selected optical pattern to generate a second object identifier; and storing the second object identifier in the memory device.

Aspect 11 is the method of any previous or subsequent aspect, wherein: the display is part of a computing device that comprises a housing; the user action is a tap on an exterior surface of the housing; and the method further comprises: identifying the selected optical pattern based on the selected optical pattern being presented with the visual indication at a time coincident with user action.

Aspect 12 is the method of any previous or subsequent aspect, further comprising: presenting a graphical element of the one or more graphical elements at a first position in the plurality of images corresponding to a first optical pattern of the plurality of optical patterns; in response to a second user action, repositioning the graphical element from the first position to a second position in the plurality of images corresponding to a second optical pattern of the plurality of optical patterns; and identifying the selected optical pattern is based on a correspondence between the graphical element and the selected optical pattern at a time coincident with the user action.

Aspect 13 is the method of any previous or subsequent aspect, wherein the visual indication comprises object information based on the object identifier.

Aspect 14 is the method of any previous or subsequent aspect, wherein the visual indication comprises a dynamic graphical element indicating decoding progress as a progress bar.

Aspect 15 is the method of any previous or subsequent aspect, wherein the visual indication comprises a dynamic graphical element presenting time since decoding by incrementally increasing a transparency of the visual indication over a period of time.

Aspect 16 is a method of image analysis for recognition of a pattern in an image containing multiple patterns, the method comprising: receiving a plurality of images acquired by a camera, the plurality of images comprising a plurality of optical patterns; presenting the plurality of images on a display in a sequence according to a framerate; receiving an indication to freeze an image of the plurality of images; freezing the image of the plurality of images on the display, based on receiving the indication to freeze the image; receiving an indication to unfreeze the image of the plurality of images; and resuming the presentation of the plurality of images on the display based on receiving the indication to unfreeze the image, according to the framerate.

Aspect 17 is the method of any previous or subsequent aspect, wherein the indication to freeze the image of the plurality of images is an interaction with the display comprising a double tap on the display.

Aspect 18 is the method of any previous or subsequent aspect, wherein the indication to unfreeze the image of the plurality of images comprises a repetition of the interaction with the display.

Aspect 19 is the method of any previous or subsequent aspect, further comprising: identifying a selected optical pattern of the plurality of optical patterns based on: a user action, and a position of the selected optical pattern in one or more of the plurality of images; presenting on the display a visual indication of the selected optical pattern; decoding the selected optical pattern to generate an object identifier; indicating, via the visual indication, that the selected optical pattern has been decoded; and storing the object identifier in a memory device.

Aspect 20 is the method of any previous or subsequent aspect, wherein the user select action is a user interaction with a device comprising the display.

Aspect 21 is the method of any previous or subsequent aspect further comprising: decoding the plurality of optical patterns to generate a plurality of object identifiers; and storing the plurality of object identifiers in the memory device.

Aspect 22 is the method of any previous or subsequent aspect, wherein: the plurality of optical patterns are arranged according to a predefined arrangement of optical patterns; identifying the selected optical pattern comprises identifying the predefined arrangement of optical patterns; the user select action is a screen touch in a region of the display over the predefined arrangement of optical patterns; and presenting the visual indication comprises at least one of an indication of the predefined arrangement of optical patterns or a plurality of visual indications corresponding to the plurality of optical patterns.

Aspect 23 is the method of any previous or subsequent aspect, wherein the visual indication comprises object information based on the object identifier.

Aspect 24 is the method of any previous or subsequent aspect, wherein the visual indication comprises a dynamic graphical element indicating decoding progress as a progress bar.

Aspect 25 is the method of any previous or subsequent aspect, wherein the visual indication comprises a dynamic graphical element presenting time since decoding by incrementally increasing a transparency of the visual indication over a period of time.

Aspect 26 is the method of any previous or subsequent aspect, further comprising: presenting a graphical element on the display, the graphical element superimposed at a position of the plurality of images; identifying a selected optical pattern of the plurality of optical patterns based on the graphical element being superimposed over the selected optical pattern in one or more of the plurality of images; presenting on the display a visual indication of the selected optical pattern; decoding the selected optical pattern to generate an object identifier; indicating, via the visual indication, that the selected optical pattern has been decoded; and storing the object identifier in a memory device.

Aspect 27 is the method of any previous or subsequent aspect, further comprising: ascertaining a first number of optical patterns of the plurality of optical patterns in a first image of the plurality of images; ascertaining a second number of optical patterns of the plurality of optical patterns in a second image of the plurality of images; ascertaining a change extent between the first number of optical patterns and the second number of optical patterns; comparing the change extent to a threshold change criterion; and if the change extent satisfies the threshold change criterion, generating the indication to freeze the image of the plurality of images.

Aspect 28 is the method of any previous or subsequent aspect, further comprising: generating the indication to unfreeze the image of the plurality of images after a period of time has elapsed.

Aspect 29 is the method of any previous or subsequent aspect, wherein: the second image corresponds to a second position in the sequence following a first position in the sequence corresponding to the first image.

Aspect 30 is the method of any previous or subsequent aspect, wherein a separation between the first position and the second position corresponds to a period of time according to the framerate.

Aspect 31 is the method of any previous or subsequent aspect, wherein the period of time is 300 ms.

Aspect 32 is the method of any previous or subsequent aspect, further comprising: identifying an application, executed on a device comprising the camera and the display, the application being configured to generate the plurality of images using the camera; identifying an application framerate of the application; and determining the first position and the second position according to the application framerate and a predetermined time period.

Aspect 33 is the method of any previous or subsequent aspect, further comprising: identifying a device framerate of the device; and determining the first position and the second position according to the device framerate and a predetermined time period.

Aspect 34 is the method of any previous or subsequent aspect, further comprising ascertaining a plurality of device parameters in real time describing at least one of the device, the camera, or a user or a user of the device, wherein determining the first position and the second position comprises: calculating an updated time period using the plurality of device parameters; and redetermining the second position and the first position, according to the device framerate, to correspond to the updated time period.

Aspect 35 is the method of any previous or subsequent aspect, further comprising: decoding the plurality of optical patterns to generate a plurality of object identifiers; ascertaining a number of object identifiers corresponding to the plurality of object identifiers; ascertaining that the number of object identifiers satisfies a threshold criterion; identifying a selected image of the plurality of images comprising the plurality of optical patterns based on the number of object identifiers satisfying the threshold criterion; and presenting the selected image on the display.

Aspect 36 is the method of any previous or subsequent aspect, wherein the threshold criterion is a change extent of the number of object identifiers, comprising a variation parameter in the number of object identifiers over a period of time.

Aspect 37 is the method of any previous or subsequent aspect, further comprising: presenting a first object identifier of the plurality of object identifiers; presenting first object information associated with the first object identifier on the display; in response to a second user action, presenting a second object identifier of the plurality of object identifiers on the display and removing the first object identifier and the first object information from the display; and presenting second object information associated with the second object identifier.

Aspect 38 is a method of image analysis for recognition of a pattern in an image, the method comprising: receiving a plurality of images acquired by a camera, the plurality of images comprising a plurality of optical patterns; detecting the plurality of optical patterns; and providing an auditory prompt comprising a sound recording, the sound recording comprising information describing the optical patterns.

Aspect 39 is the method of any previous or subsequent aspect, wherein the plurality of images is a first plurality of images, the first plurality of images comprising: an image border and a partial optical pattern adjacent to the image border; the method further comprising: ascertaining an orientation of the partial optical pattern relative to the image border; generating a first prompt, as playback of a first recorded sound, to move the camera in a first direction based on the orientation; receiving a second plurality of images acquired by the camera, the second plurality of images comprising a complete optical pattern corresponding to the partial optical pattern; decoding the complete optical pattern to generate an object identifier; providing a second prompt, as playback of a second recorded sound, to indicate successful decoding of the complete optical pattern; and storing the object identifier in a memory device.

Aspect 40 is the method of any previous or subsequent aspect, further comprising: decoding one or more optical patterns in a first image of the first plurality of images; and decoding one or more optical patterns in a second image of the second plurality of images, the one or more optical patterns in the first image being different from the one or more optical patterns in the second image.

Aspect 41 is the method of any previous or subsequent aspect, wherein the partial optical pattern is a barcode, constructed of parallel bars.

Aspect 42 is the method of any previous or subsequent aspect, further comprising: presenting the first plurality of images on a display; presenting a first graphical element on the display, the first graphical element indicating the partial optical pattern; presenting the second plurality of images on the display; and presenting a second graphical element on the display, the second graphical element indicating the complete optical pattern.

Aspect 43 is the method of any previous or subsequent aspect, further comprising: presenting, on a display, a highlighted region overlaid on the plurality of images corresponding to an optical pattern of the plurality of optical patterns.

Aspect 44 is the method of any previous or subsequent aspect, further comprising: identifying a selected optical pattern of the plurality of optical patterns; decoding the selected optical pattern to generate an object identifier; providing a second auditory prompt to indicate successful decoding of the selected optical pattern; ascertaining object information based on the object identifier; and generating a third auditory prompt comprising the object information.

Aspect 45 is the method of any previous or subsequent aspect, further comprising: presenting, on a display, a visual indication comprising the object information; receiving, via a microphone, a vocal command comprising a confirmation instruction; and storing the object identifier in a memory device, in response to recognizing the confirmation instruction.

Aspect 46 is the method of any previous or subsequent aspect, further comprising: selecting an optical pattern appearing in the plurality of images; identifying an image of the plurality of images such that the image contains the optical pattern at a resolution satisfying a threshold resolution; and decoding the optical pattern in the image.

Aspect 47 is the method of any previous or subsequent aspect, further comprising: identifying a predefined arrangement of optical patterns in the plurality of images; identifying a selected optical pattern of the predefined arrangement of optical patterns, based at least in part on a position of the selected optical pattern in the predefined arrangement of optical patterns; detecting the selected optical pattern in an image of the plurality of images; decoding the selected optical pattern to generate an object identifier; and storing the object identifier in a memory device.

Aspect 48 is the method of any previous or subsequent aspect, further comprising: providing a second auditory prompt comprising the object identifier; receiving, via a microphone, a vocal command comprising a confirmation instruction; and storing the object identifier in the memory device, in response to recognizing the confirmation instruction.

Aspect 49 is the method of any previous or subsequent aspect, further comprising: receiving, via a microphone, a vocal command comprising an inventory quantity; and storing the inventory quantity in the memory device in association with the object identifier, in response to recognizing the vocal command.

Aspect 50 is the method of any previous or subsequent aspect, further comprising: presenting, on a display, a visual indication comprising the vocal command; providing a third auditory prompt comprising the inventory quantity; and receiving, via the microphone, a second vocal command comprising a confirmation instruction.

What is claimed is:

1. A method of image analysis for recognition of a pattern in an image, the method comprising:
   receiving a plurality of images acquired by a camera, the plurality of images comprising a plurality of optical patterns in an arrangement, wherein the plurality of optical patterns are disposed on a label affixed to an object in the plurality of images, and wherein one or more of the plurality of optical patterns encode an object identifier;
   matching the arrangement to a pattern template, wherein the pattern template is a predefined arrangement of optical patterns;
   identifying an optical pattern of the plurality of optical patterns as a selected optical pattern based on a position of the selected optical pattern in the arrangement;
   decoding the selected optical pattern to generate the object identifier;
   storing the object identifier in a memory device;
   estimating a relative dimension of the object in an image of the plurality of images in comparison to a relative dimension of the label in the image; and
   estimating a physical dimension of the object based on the relative dimension of the object.

2. The method of claim 1, wherein the plurality of optical patterns are barcodes, constructed of parallel bars.

3. The method of claim 1, further comprising:
   comparing the physical dimension of the object to an expected physical dimension of the object associated with the object identifier;
   matching the object to the object identifier; and
   presenting a graphical element on a display indicating a match.

4. The method of claim 1, wherein the physical dimension of the object comprises at least one of a volume of the object or a weight of the object.

5. The method of claim 1, further comprising:
   ascertaining a logistical criterion based on the physical dimension.

6. The method of claim 5, wherein the logistical criterion comprises at least one of a postage rate, an inventory order identifier, a packing order, or a warehouse location identifier.

7. The method of claim 1, further comprising:
   presenting the plurality of images comprising the pattern template on a display;
   and
   presenting a graphical element overlaid on the selected optical pattern.

8. The method of claim 7, further comprising:
   Presenting a visual indication of the pattern template on the display.

9. The method of claim 1, wherein the position is identified in relation to an edge of the label.

10. The method of claim 1, wherein the plurality of optical patterns comprises a string of characters.

11. The method of claim 1, wherein the plurality of optical patterns comprises a two-dimensional optical code.

12. The method of claim 1, wherein the object is a first object, and wherein the method further comprises:
    estimating a physical dimension of a second object in the plurality of images based on the relative dimension of the label in the image.

13. A system, comprising:
    a camera having an image sensor configured to acquire a plurality of images; and
    one or more processors configured to:
    receive the plurality of images acquired by the image sensor, the plurality of images comprising a plurality of optical patterns in an arrangement, wherein the plurality of optical patterns are disposed on a label affixed to an object in the plurality of images, and wherein one or more of the plurality of optical patterns encode an object identifier;
    match the arrangement to a pattern template, wherein the pattern template is a predefined arrangement of optical patterns;
    identify an optical pattern of the plurality of optical patterns as a selected optical pattern based on a position of the selected optical pattern in the arrangement;

decode the selected optical pattern to generate the object identifier;

store the object identifier in a memory device;

estimating a relative dimension of the object in an image of the plurality of images in comparison to a relative dimension of the label in the image; and estimating a physical dimension of the object based on the relative dimension of the object.

14. The system of claim 13, wherein the one or more processors are further configured to:

ascertain a logistical criterion based on the physical dimension, the logistical criterion comprising at least one of a postage rate, an inventory order identifier, a packing order, or a warehouse location identifier.

15. The system of claim 13, wherein the one or more processors are further configured to:

compare the physical dimension of the object to an expected physical dimension of the object associated with the object identifier;

match the object to the object identifier; and present a graphical element on a display indicating a match.

16. The system of claim 13, wherein the one or more processors are further configured to:

present the plurality of images comprising the pattern template on a display; and present a graphical element overlaid on the selected optical pattern.

17. The system of claim 13, wherein the plurality of optical patterns comprises a string of characters.

18. The system of claim 13, wherein the plurality of optical patterns comprises a two-dimensional optical code.

19. A memory device comprising instructions that, when executed, cause one or more processors to perform the following steps:

receiving a plurality of images acquired by a camera, the plurality of images comprising a plurality of optical patterns in an arrangement, wherein the plurality of optical patterns are disposed on a label affixed to an object in the plurality of images, and wherein one or more of the plurality of optical patterns encode an object identifier;

matching the arrangement to a pattern template, wherein the pattern template is a predefined arrangement of optical patterns;

identifying an optical pattern of the plurality of optical patterns as a selected optical pattern based on a position of the selected optical pattern in the arrangement;

decoding the selected optical pattern to generate the object identifier;

storing the object identifier in a memory device;

estimating a relative dimension of the object in an image of the plurality of images in comparison to a relative dimension of the label in the image; and estimating a physical dimension of the object based on the relative dimension of the object.

20. The memory device of claim 19, further comprising instructions that, when executed, cause one or more processors to perform the following steps:

presenting the plurality of images comprising the pattern template on a display; and presenting a graphical element overlaid on the selected optical pattern.

\* \* \* \* \*